(12) United States Patent
Crampton

(10) Patent No.: US 6,611,617 B1
(45) Date of Patent: Aug. 26, 2003

(54) SCANNING APPARATUS AND METHOD

(76) Inventor: Stephen James Crampton, 9 Broadfields, Goffs Oak, Waltham Cross, Herts EN7 5JU (GB)

( * ) Notice: Subject to any disclaimer, the term of this patent is extended or adjusted under 35 U.S.C. 154(b) by 0 days.

(21) Appl. No.: 09/000,215

(22) PCT Filed: Jul. 25, 1996

(86) PCT No.: PCT/GB96/01868

§ 371 (c)(1),
(2), (4) Date: May 26, 1998

(87) PCT Pub. No.: WO97/05449

PCT Pub. Date: Feb. 13, 1997

(30) Foreign Application Priority Data

Jul. 26, 1995 (GB) ............................................. 9515311

(51) Int. Cl.[7] ............................. G06K 9/00; G01D 11/14
(52) U.S. Cl. ........................ 382/154; 382/153; 356/614
(58) Field of Search ................................ 382/154, 153, 382/100, 118, 232, 260, 199, 203, 266, 312; 345/421, 425, 430, 422, 514, 516, 427, 627, 589; 356/614, 3.14, 141.4

(56) References Cited

U.S. PATENT DOCUMENTS

| | | | | |
|---|---|---|---|---|
| 4,649,504 A | * | 3/1987 | Krouglicof et al. | 702/153 |
| 4,825,391 A | * | 4/1989 | Merz | 345/589 |
| 4,982,102 A | | 1/1991 | Inoue et al. | 250/559.22 |
| 4,993,835 A | | 2/1991 | Inoue et al. | 356/607 |
| 5,090,811 A | | 2/1992 | Donaldson | 356/376 |
| 5,168,528 A | | 12/1992 | Field, Jr. | 382/103 |
| 5,191,642 A | * | 3/1993 | Quick et al. | 345/427 |
| 5,198,877 A | * | 3/1993 | Schulz | 356/614 |
| 5,251,296 A | * | 10/1993 | Rhoden et al. | 345/564 |
| 5,255,096 A | | 10/1993 | Boyle | 348/95 |
| 5,264,578 A | | 11/1993 | Powell et al. | 219/130.01 |
| 5,268,996 A | * | 12/1993 | Steiner et al. | 257/586 |
| 5,357,599 A | * | 10/1994 | Luken | 345/627 |
| 5,886,703 A | * | 3/1999 | Mauldin | 345/423 |

FOREIGN PATENT DOCUMENTS

| | | |
|---|---|---|
| DE | 3938714 A1 | 5/1991 |
| DE | PCT/AT91/00115 | 5/1992 |
| EP | 0159187 A1 | 10/1985 |
| FR | PCT/FR90/00090 | 9/1990 |
| GB | 2264601 A | 9/1993 |
| GB | 2264602 A | 9/1993 |
| GB | PCT/GB95/01994 | 2/1996 |
| WO | PCT/US91/07511 | 4/1992 |
| WO | WO 96/10205 | 4/1996 |

OTHER PUBLICATIONS

Sakaguchi et al., "Acquisition of Entire Surface Data Based on Fusion of Range Data," *IEICE Transactions*, vol. E 74, No. 10 (1991).

Fisher et al., "A Hand–held Optical Surface Scanner for Environmental Modeling and Virtual Reality," Department of Artificial Intelligence, University of Edinburgh.

Besl, P.J. and N.D. McKay, "A Method for Registration of 3–D Shapes", *IEEE Transactions on Pattern Analysis and Machine Intelligence*, vol. 4, No. 2, pp. 239–256, Feb. 1992.

* cited by examiner

*Primary Examiner*—Andrew W. Johns
*Assistant Examiner*—Duy M. Dang
(74) *Attorney, Agent, or Firm*—Christensen O'Connor Johnson Kindness PLLC

(57) ABSTRACT

A scanning apparatus and method for generating computer models of three-dimensional objects comprising means for scanning the object to capture data from a plurality of points on the surface of the object so that the scanning may capture data from two or more points simultaneously, sensing the position of the scanning means, generating intermediate data structures from the data, combining intermediate data structures to provide the model; display, and manually operating the scanning apparatus. The signal generated is structured light in the form of a stripe or an area from illumination sources such as a laser diode or bulbs which enable data for the position and color of the surface to be determined. The object may be on a turntable and may be viewed in real time as rendered polygons on a monitor as the object is scanned.

11 Claims, 23 Drawing Sheets

Figure 20(a)
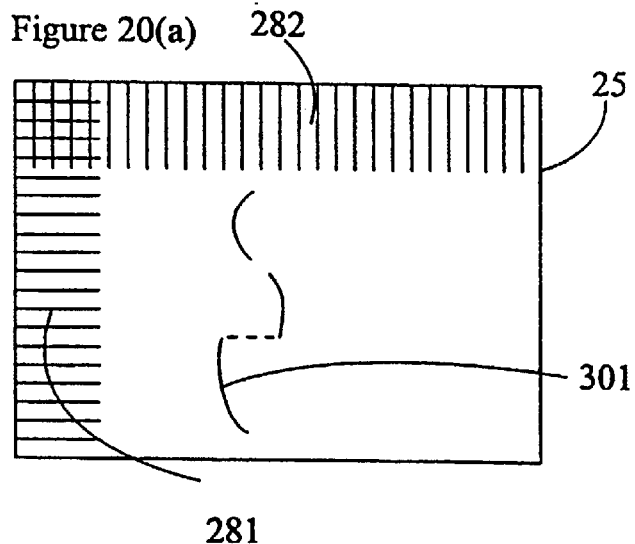
Figure 20(b)
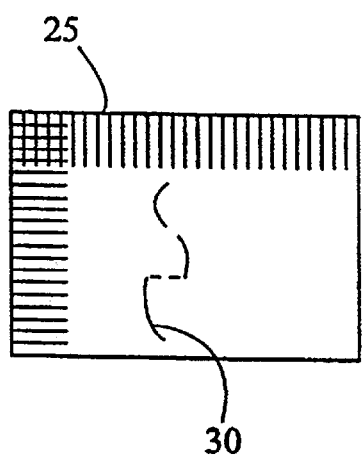
Figure 20(c)
302 ~ •a
•b
•c
•d
•e
•f
•g
•h
•i
•j
•k
Figure 20(d)
302a
302b
302c
303 ~ 302d
304g
302h
302i
302j
302j
305
302k
302l
Figure 20(e)
307 ~ •a
•b
Figure 20(f)
308 ~ 307a
307b
Figure 20(g)
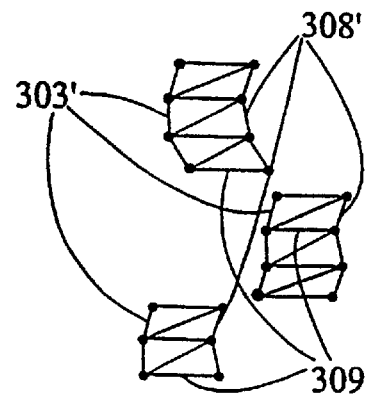

SCANNING APPARATUS AND METHOD

CROSS-REFERENCE TO RELATED APPLICATIONS

This is a United States national application corresponding to copending international application PCT/GB96/01868, filed July 25, 1996, which designates the United States, the benefit of the filing date of which is hereby claimed under 35 U.S.C. §371, which in turn claims the benefit of British Application No. 9515311.0, filed July 26, 1995, the benefit of the filing date of which is hereby claimed under 35 U.S.C. 119.

FIELD OF THE INVENTION

This invention relates to an apparatus and method for scanning a three dimensional object.

BACKGROUND OF THE INVENTION

Real-world, three-dimensional objects whether with natural form (e.g. geographical, plant, human or animal-like) or man-imagined form (e.g. sculptures, reliefs, cars, boats, planes or consumer products) are difficult to scan. This is because of features such as rapidly varying surface normals and surfaces for which a line of sight is difficult because it is partially obscured by other parts of the object.

Scanning machines—also known as digitizing machines—for scanning objects or parts of objects can be categorised into two types: computer numerically controlled (CNC) and manually operated. A scanning machine includes a unit that contains a sensing means commonly referred to as a probe.

Objects or parts of objects can be scanned on CNC scanning machines with a number of computer numerically controlled (CNC) linear and rotating motor-driven axes. Different CNC machines can move/reorient the probe or the object—or both—by a combination of translation and rotation about these axes. Different machine designs are suited to different classes of objects. Probes can be temporarily or permanently attached to most types of CNC machine tool or CNC coordinate measuring machine which can then be used for scanning. As examples, small and simple 3-axis CNC milling machines may be used or large, complex 5-axis machines may be used. The points captured by CNC machines are usually on a regular grid and the rate varies from around 1 point per second up to around 20,000 points per second depending on the technology being used and the object being scanned. The points from these scanning machines are accurate to the order of 0.05 mm. CNC machines with probes scan by executing one or more programs that move the axes of the machine such that there is relative motion between the probe and the object.

CNC machines are expensive, partly because of the incorporation of motors and the associated equipment for assuring rejection motion such as linear guides and drive screws. Few CNC machines are flexible enough so that the probe can be oriented in six degrees of freedom so as to scan the complete surface of a complex object. Even when a CNC machine has six degrees of freedom, it is often not sufficiently flexible so as to position the probe to scan the complete surface of the object without colliding with the object. When the object is a person or expensive, the risk of using a CNC machine may be unacceptable and there would be a necessity to make a machine to meet both the safety and scanning requirements of the application. The programming of a CNC machine so that the surface of the object is completely scanned without a collision of the probe or machine with the object is often highly complex. Usually the design of the machine and the degrees of freedom inherent in the design and limitations in the probe design such as the standoff distance during scanning between the probe and the object, mean that it is impossible to come up with a scanning strategy that will scan the complete surface of the object. It is common that the object has to be manually picked up and replaced in a different position and or orientation one or more times during scanning. Each time that this occurs, the object has to be registered to a uniform coordinate system such that the data from the different scans can be accurately combined.

Manually operated scanning machines can be categorised into three types: horizontal arm machines, multiply jointed arms and devices based on remote position sensing means.

Manually driven, horizontal arm measuring machines usually have three orthogonal axes and are usually based on a travelling column design. These machines are usually quite large with the bed being at floor level so large items such as cars can easily be moved onto and off them. Often motors can be engaged on one or more axes to aid the manual movement of the machine. The probe is normally mounted at a fixed orientation on the end of the horizontal arm. This orientation may be changed and various devices may be attached between the end of the horizontal arm and the probe to aid the changing of the orientation, most of these devices having two axes. Horizontal arm machines have the disadvantage of not being able to easily orient the probe in six degrees of freedom. The limited flexibility in the design of a horizontal arm machine makes most of the far side of the object unscannable.

Multiply jointed arms commonly comprise multiple linkages and are available for scanning complex objects. A multiply jointed arm typically has 6 joint axes but may have more or less joint axes. At the end of the multiply jointed arm there is usually a tip reference point—such as a sphere whose centre is the reference point or a cone ending in a point. Scanning is carried out by bringing the point or sphere into contact with the object being scanned. The computer monitoring the multiply joined arm then measures the angles at all the joints of the multiply jointed arm and calculates the position of that reference point in space. The direction of the last link in the multiply jointed arm is also calculated. Positions can typically be output continuously at a rate of around 100 points per second, but the rate can be much more or much less. The accuracy is of the order of 0.1 to 0.5 mm. The points from the arm are usually sparse and unorganised. The sparseness and lack of organisation of the points makes it difficult to provide enough information for constructing a computer model of the object that is of acceptable quality. A multiply jointed arm with multiple linkages has a limited working volume. In general, if a larger working volume is required, the arms become very expensive, less accurate and tiring, difficult to operate. The limited working volume can be increased by leapfrogging in which the whole arm/base is moved to access another volume, but this requires a time consuming system of registering at least 3 points each time the arm is moved and recombining the data sets from each arm position. Manufacturer's of multiplying jointed arms provided pre-calibrated arms and test methods that the user may employ to make sure that the arm is still calibrated to an acceptable accuracy. Such test methods use for example the standard tip reference point at the end of the arm and a reference sphere or a ball-bar which is a rod with two cylindrical cups that has a precise known distance between a home ball and a end of arm ball. As the arm tip at the end of the ball bar is moved on the surface of spherical domain the arm records positions which are later compared to a perfect sphere and error estimates for the arm are output.

Remote position sensing devices include hand-held devices that transmit or receive position information in a calibrated reference volume using different physical methods including electromagnetic pulses and sound waves. A hand-held device may be connected to the rest of the system by means of a cable. These devices are prone to generating scanned points with very large errors and some devices cannot work when the object being scanned has metallic components. They are less accurate than multiply jointed arms with accuracies of the order of 0.5 μm upwards.

There are three broad categories of scanning probe that could be mounted on the end of a multiply jointed scanning machine: point, stripe and area probes. Point probes measure a single point at a time and technologies include mechanical contact methods and optical distance measurement methods. Stripe probes measure a number of points in a line either simultaneously or rapidly in a scanned sequence; the most common stripe technology is laser stripe triangulation. Area probes measure a two-dimensional array of points on a surface either simultaneously or in a scanned sequence; the most common technologies are interference fringe and multiple stripe projection. Some area methods require the device to be held still for a few seconds during data capture. Stripe and area methods have an in-built speed advantage over point methods as there are less motion of the probe relative to the object. There are differences between the methods in terms of accuracy and cost but these do not generalise with category, for example a particular area technology may be cheaper and more accurate than another point technology.

Means of capturing independent reference/feature points by contact are well known and efficient. Structured light using stripe or area methods is not good at capturing independent feature points because there is no way for the operator to align a known point on the object with a point on the stripe or in the area.

Geometrical errors in the scanning process stem from many sources. CCD cameras can typically capture video at 25 frames per second. One major disadvantage in normal use is that from any given demand for a frame there is a variability of 40 msecs until the start of capture of that frame. If the probe is being moved at for example 100 mm/sec, this can lead to a geometrical error of 4 mm in the probe's data. The duration of frame capture depends upon the shutter speed e.g. $\frac{1}{100}$ sec is 10 msecs. One major disadvantage in normal use is that if the probe is being moved with a slow shutter speed, an additional geometrical error is created. An arm is typically connected to a computer by a serial cable with arms typically generating positions at 125 positions per second as they move; at this rate there is a variability of 8 msecs between when a position is needed at the computer and when it arrives. This can also introduce a geometrical error when the probe is moving. The total variabilities of the CCD camera and the arm can cause large aggregate errors.

There is a wide range of formats for 3D information in current use. These include the general categories: point formats, polygon formats and complex surface formats.

Point formats include: independent points, lines of points where a plane intersects with a surface, 2.5D areas of points which are commonly known as range images which are single valued in Z and 3D point arrays which are often generated by medical scanners. The point formats have many standard representations including the Range Image Standard (RIS) resulting from the European ESPRIT Research & Development Project 6911, IGES and DXF published by AutoDesk Inc in the USA.

Polygon formats include polygons of different geometrical form. Polygons may be 3 or more sided and formats may include mixed numbers of sides or always the same number of sides. Special cases such as Delaunay triangulation can specify the positioning of vertices and the relative lengths of sides of polygons. Standard representations of polygon formats include STL published by 3D Systems Inc in the USA, IGES, OBJ published by Wavefront Inc in the USA and DXF.

Complex surface formats include Bezier, NURBS, and COONS patches. Standard representations of complex standards formats include IGES, VDA-FS, SET, STEP and DXF.

The objective of scanning can be simply to gather a number of three-dimensional points on the surface of the object, or it may be to create a computer model in a format that is fuseful for the application in which the model is to be used. It is generally true that a cloud of points alone is not much use in many applications and that more structure is needed to make a computer model efficient to manipulate in typical applications such as visualisation, animation, morphing and surface or solid modeling.

There are often benefits to be gained from reducing the size of the files associated with the model formats. Any file, whatever its format can be compressed using standard reversible utilities such as PKZIP/PKUNZIP from PKWare in the USA. With 3D point arrays, an octet format can be used to reduce the size of the arrays that represent a surface; an octet format splits a cubic volume into eight, smaller cubes and only further subdivides cubes by eight if they contain information; an octet format is reversible. Moving from unstructured point representation to polygon or complex surface formats often produces large compressions but relies on approximations so the process is nearly always irreversible and it is also difficult to automate so as to give good enough results. Chordal tolerancing is a commonly used method of reducing the quantity of discrete points in a 2D or 3D polyline. As an intermediate data structure it has disadvantages in that: the intermediate data structure does not record the orientation of each stripe, it does not record breaks in the data but assumes that all the points are connected by a surface and it does not record jumps in the data such as those caused by occlusions.

Most scans today are carried out using a multiply jointed arm with a tip reference point. It is usual to firsf mark the object to be scanned with a permanent or temporary marking device such as an ink pen or scribe to create a polygonal network of splines. A single point is then scanned at each network intersection. On the computer, the points are linked together into a polygonal structure. The overall process (marking, scanning and linking) of creating a 3D polygonal model is at a typical rate of 1 point (or vertex on the model) every 3 seconds. In some implementations, the network is not marked on, but appears on a computer display as each point is scanned; with this implementation, the network is built up interactively. This method is suitable for models with a relatively small number of vertices i.e. hundreds and thousands. The method is very slow, requires skill, patience and concentration, is expensive in human time particularly for large, detailed objects that can take 3 weeks to scan.

An alternative method of scanning with a multiply jointed arm and contact tip reference point has often been tried in which independent points are rapidly captured without the aid of network. The points are then input into a surfacing software package which then constructs a polygonal network between the points. However, the 'polygonisation' of unorganised data points is usually very slow and speed decreases significantly as the number of points increases. The results are usually so poor as to be unacceptable. There is usually a significant amount of hand editing of the data required.

Where a CNC scanning machine is used, the intermediate data structures are usually range images. A number of unregistered range images may be registered, polygonised and integrated together. The raw data is a number of range images of an object: typically from 5 to 20 in number, with each one either being a cylindrical or a linear range image. The process is not automatic and requires a combination of operator guidance and automated execution of algorithms. The operator first tries to align (i.e. register) the range images to each other on the computer using a graphics display. This process is not accurate and is followed by an automatic least squares fitting process that attempts to adjust the position and orientation of each range image such that they fit together as well as possible; this process is lengthy often taking hours on a powerful computer. Each range image is then independently polygonised into a network of 2.5D triangular polygons. Finally, the networks of triangular polygons are integrated together. The output is a single, 3D polygon dataset. The process is expensive both in terms of capital equipment cost and people time. It can take up to two years to become skilled enough to scan objects to produce good enough models. It can work and produce good results for detailed objects.

For smooth objects, where the objective is to create complex surface formats, a coordinate measuring machine with a contact tip reference point is commonly used. It is usual to mark up the object with the desired surface patch boundaries by using a marking device such as a pen or a scribe. These patch boundaries are then hand digitised with the contact point probe. The software package then generates a CNC scanning program that automatically takes more points along the boundaries and inside the patches. The software then automatically generates a first attempt at the surface model. This method is used because it is quicker and easier for the operator to define patch boundaries that will lead to a surface model with the desired structure before scanning than to define the patch boundaries after scanning using a software package on a computer with a display showing the scanned points. It can take several days and often weeks to create patch boundaries which are usually splines and then create the patches and then trim the patches to form a surface model by using only the scanned points and a computer.

Scanned data points have been displayed in real-time. The display of points has the disadvantages of easily becoming confusing to interpret and also that the observer does not know when parts of the object's surface have been missed during scanning.

SUMMARY OF THE INVENTION

According to the present invention, there is provided a scanning apparatus for scanning an object to provide a computer model thereof, comprising means for scanning the object to capture data from a plurality of points on the surface of the object where the scanning means captures data from two or more points simultaneously; means for generating intermediate data structures therefrom; means for combining the intermediate data structures to provide the model; means for display and means for manually operating the scanning apparatus.

The apparatus is most efficient in the quest to reduce the time and cost of generating a computer model from a real world object by means of scanning with both time and cost reductions of an order of magnitude achieved over conventional techniques. The model is generated automatically from the intermediate data in a form that may be immediately usable in a wide range of applications.

The scanning means may use structured light to more quickly scan the surface of the object. The scanning means may also be operable to sense the colour of the surface of the object, resulting in a model more like the real world object.

Preferably the scanning means therein comprises means for generating a signal for scanning the object, signal detection means for detecting the signal reflected from the object and means operable in response to the detected signal to provide the data for the intermediate data structure.

The structured light is preferably projected as a plane of light such that a stripe is formed on a viewing plane that is situated normal to the projection axis of the signal generating means and situated at the average stand-off distance from the signal generating means.

Alternatively the structured light may be projected such that a pattern is formed on an area of a viewing plane that is situated normal to the projection axis of the signal generating means and situated at the average stand-off distance from the signal generating means.

The signal generating means may be an illumination source such as a laser diode or one or more bulbs.

During scanning, the operator may see the surface he has scanned appearing in real-time as rendered polygons on the display such that he may more easily scan the object. The operator may mount the object on a turntable and then he may scan from a seated position rather than walking around the object. The scanning means can be mounted on many different types of manual machines, giving enhanced flexibility for objects ranging in size from small to very large. The scanning means can be mounted on a multiply jointed arm for accurate scanning. The scanning means may be a self-contained unit that contains a remote position sensor and incorporates a display to give the most flexibility in scanning.

According to the invention there is also provided a method for scanning an object to provide a computer model thereof, comprising the following steps:

manually scanning the object with a signal by manual operation of a signal generating means:

detecting the reflected signal generating intermediate data structures for the points;

combining the intermediate data structures to provide the model; and displaying the data, wherein the data is captured from a plurality of points on the surface of the object simultaneously.

According to a further aspect of this method of the invention the colour data is also captured from the object and then mapped on to the model.

Preferably the data is displayed simultaneously as a plurality of display polygons.

The invention will now be described, by way of example only, with reference to the accompanying Figures, of which:

BRIEF DESCRIPTION OF THE DRAWINGS

FIG. 3d is a graph illustrating intensity as a function of distance along the line A1–A2 of FIG. 3a;

FIGS. 20a and 20b illustrate first and second stripes captured on a CCD array;

FIGS. 20c, 20d, 20e and 20f illustrate the respective captured data points and strings of data points from the first and second stripes of FIGS. 20a and 20b;

FIG. 20g illustrates polygons generated from these strings;

DETAILED DESCRIPTION OF EMBODIMENTS

Figure 1:
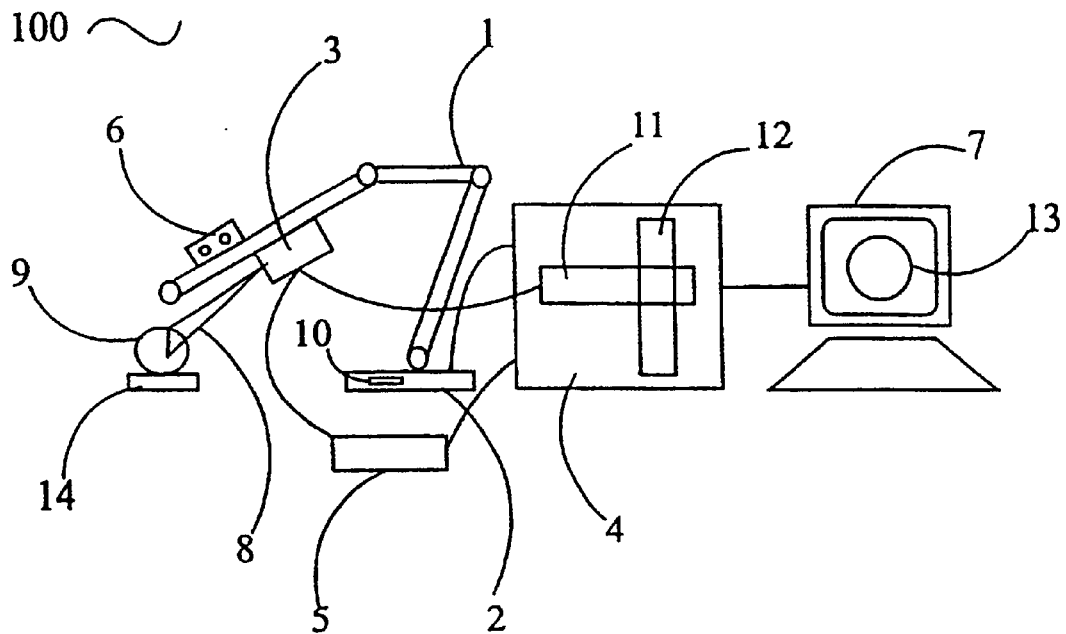
FIG. 1 is a schematic representation of a scanning apparatus according to the invention.

Referring now to FIG. 1, a scanning apparatus 100 comprises a multiply jointed arm 1 with an arm control unit 2 and a probe 3. The control unit 2, which includes a processing unit 10 is coupled to a computer or processing unit 4 and colour monitor 7. The probe 3 is also coupled to a probe control unit 5 that is likewise coupled to the computer 4. The intermediate data is displayed on the colour monitor 7 as rendered polygons 13. The probe 3 provides a stripe 8, which is projected onto an object 9 positioned on a turntable 14. The stripe 8 is in the form of a plane of light. Buttons 6 are also provided to control data capture. A colour frame grabber 11 in the computer 4 is mounted on a standard bus 12 and coupled to the probe 3.

The computer 4, probe control unit 5, arm control unit 2, buttons 6, colour frame grabber 11 and monitor 7 are provided separately, for example, the computer 4 and monitor 7 may be a personal computer and VDU, although, for certain applications, it may be more convenient for one or all of them to be provided on the probe 3.

The multiply jointed arm 1 and the probe 3 are coupled to the computer 4 by means of the control units 2, 5 discussed above. The computer 4 receives information from the scanning stripe 8, the position/orientation of the arm 1 in terms of X, Y, Z coordinates, with the coordinates I,J,K of the surface normal of the probe 3 and colour data if required.

Figure 2:
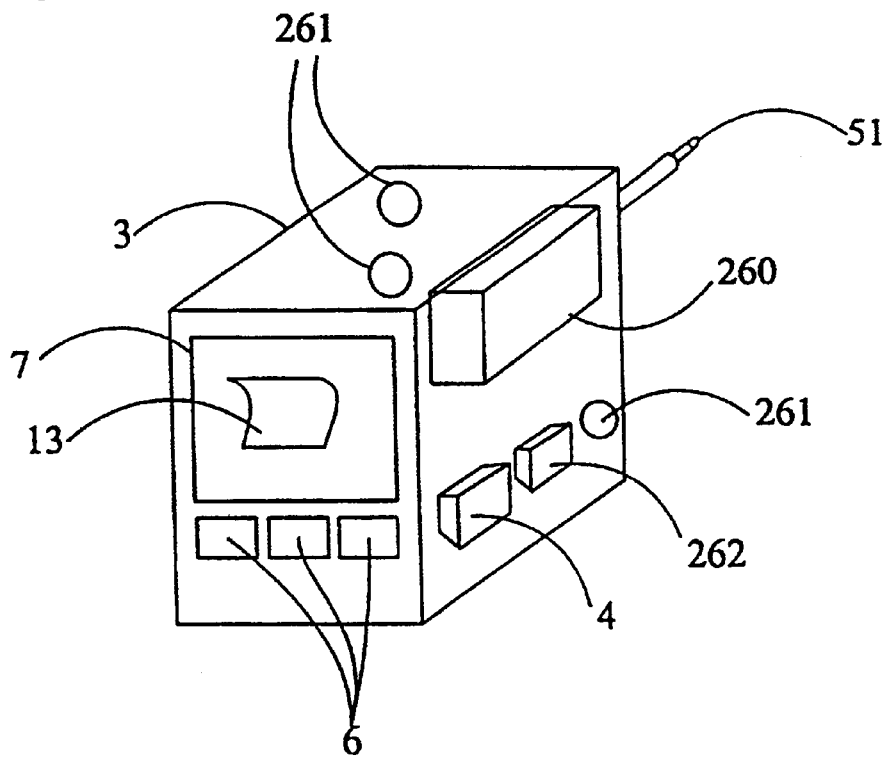
FIG. 2 is a schematic perspective drawing of a probe.

Referring now to FIG. 2, an embodiment of the probe 3 for use with remote position sensor 261 is shown. The probe 3 is lightweight and resilient so as to withstand being knocked without losing its calibration.

Figure 29A:
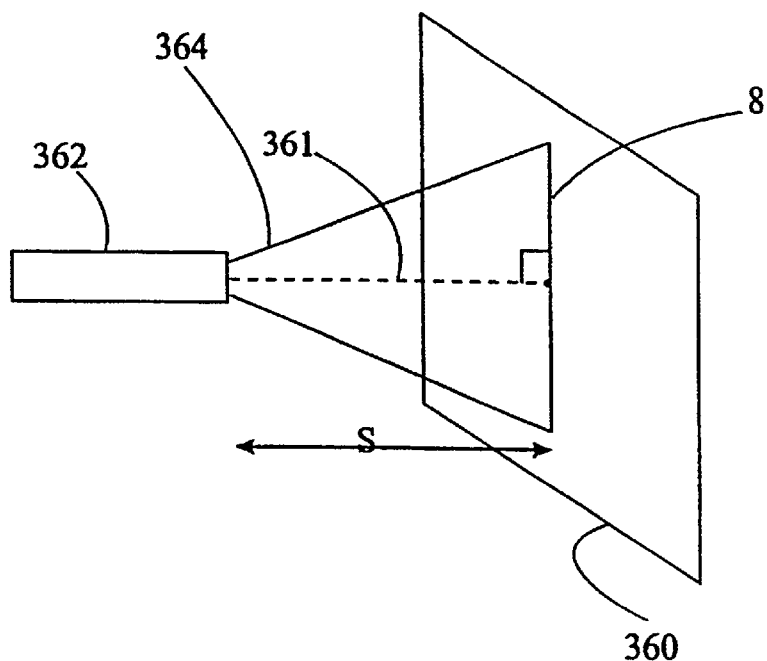
FIG. 29a illustrates stripe scanning.

Referring now to FIG. 29a, the structured light is preferably projected as a plane of light 364 such that a stripe 8 is formed on a viewing plane 360 that is situated normal to the projection axis 361 of the signal generating means 362 and situated at the average stand-off distance S from the signal generating means.

Figure 29B:
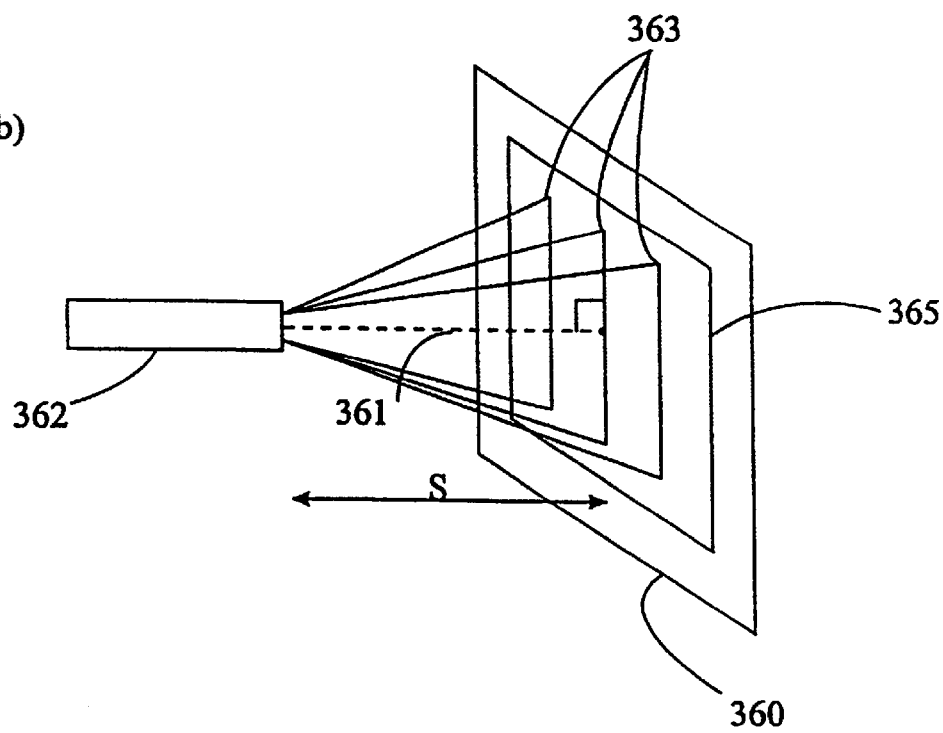
FIG. 29b illustrates area scanning.

Referring now to FIG. 29b, the structured light may be projected such that a pattern 363 is formed on an area 365 of a viewing plane 360 that is situated normal to the projection axis 361 of the signal generating means 362 and situated at the average stand-off distance S from the signal generating means. The patterns 363 in this example is a number of stripes which may be of different colours.

Figure 3A:
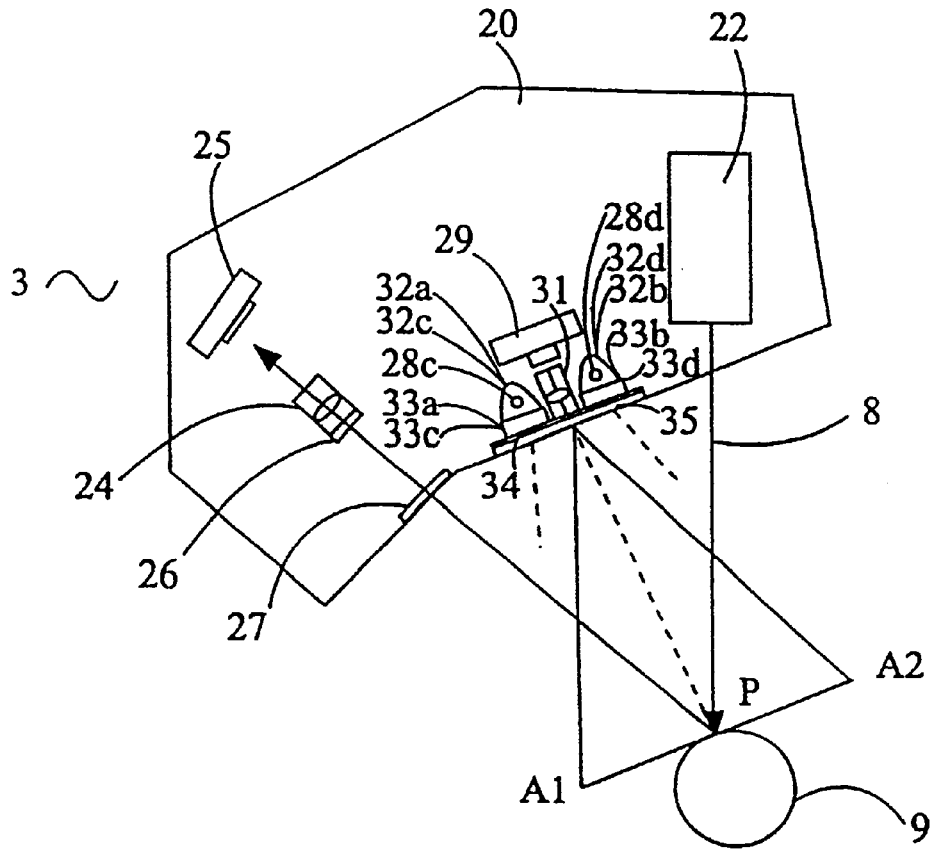
FIG. 3a illustrates a first embodiment of the configuration of the optical elements housed in a probe.
Figure 3B:
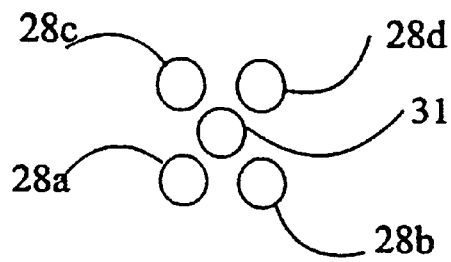
FIG. 3b illustrates a lamp configuration.
Figure 3C:
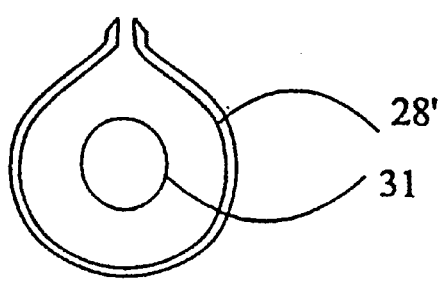
FIG. 3c illustrates an alternative to the lamp configuration of FIG. 3b.
Figure 3D:
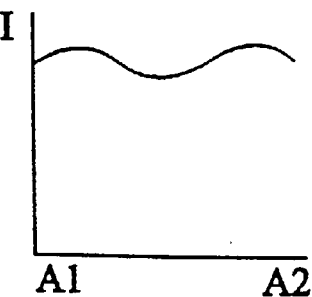

Two alternative embodiments of the probe 3 are described. Now referring to FIGS. 3a; 3b; 3c; 3d, one embodiment of the probe 3 is described. The probe 3 comprises a number of components mounted on a base plate 20. A stripe generator 22—for example containing a laser diode—provides the stripe 8 for projection onto the object 9 to be scanned. Typically, the laser will be of Class 2 or less according to the CDRH 1040.11 classification in the USA viz. less than 1 mW in power at 670 nm wavelength. The stripe 8 is nominally focused at some point P. A lens assembly 24 is used to focus the image onto a high resolution CCD camera 25. The camera may be oriented at an angle satisfying the Scheimpflug condition. An optical interference notch filter 26 is used to selectively image light of the wavelength of the stripe 8. A simple, glass cut-off filter 27 reduces ambient light within the probe.

Information on the colour of the surface of the object may be recorded in intensity scales or colour scales such as RGB.

An intensity scale estimate of the colour of the surface may be obtained by recording the reflected light level of the stripe as it is imaged on the high resolution CCD camera 25 at each point. A high level indicates a light surface at that point which scatters much on the projected light and a low level indicates a dark surface at that point that absorbs much of the projected light. These indications may be false such as on specular surface as known to a person skilled in the art.

A colour estimate of the colour of the surface can be obtained by means of a colour camera 29 comprising a colour CCD array. Colour scanning requires that the object is lit. Lighting may be by means of ambient light from external light sources or by lamps situated on the probe. There are several disadvantages in using ambient light only for colour scanning: firstly, ambient light intensity varies over nearly every object in a standard environment such as a room with overhead lighting. Secondly, it can be a time consuming procedure to position a number of lights so as to evenly light the object. Thirdly, the probe itself can cast shadows onto the object.

Four lamps 28a; 28b; 28c; 28d ; are provided around the lens 31 of the camera 29 for illumination, or, a ring lamp 28' could be used. This configuration is used to avoid any problems of shadowing. The lamps may include respective back reflectors 32a; 32b; 32c; 32d where appropriate. The lamps are set to give an average intensity of around 80–150 Lux but the intensity could be much more or less and, during use, ambient light is reduced significantly below this level for example, by dimming or switching off overhead lights. This removes any effects from variations in ambient light. The lamps may be tilted with respect to the camera axis to ensure that light of a more even intensity is projected onto the object 9 at the average scanning stand-off distance. The lamps should be small in size to obtain the least possible weight penalty especially if two or more lamps are used. To extend their life, they can be operated at a lower voltage at certain time periods, for example, whilst preparing for the capture of each image. When the operator triggers a colour image capture, the voltage to the lamps can be momentarily increased to maximum. The lamps are only switched on for colour capture. During the process of 3D capture the lamps are switched off where this will also have the added advantage of increasing the signal to noise ratio. An access panel 35 can be provided over the lamps so that the lamps can be easily replaced without opening the probe and risking losing its calibration. To improve results when scanning a reflective surface, polarising material 34 is placed between the camera 29/lamps 28a; 28b; 28c; 28d and the object 9. To reduce variations in the projected light, diffusers 33a; 33b; 33c; 33d are placed in the lightpath between each lamp and object 9, or, alternatively, the lamp glass or back reflectors are treated accordingly.

Figure 4:
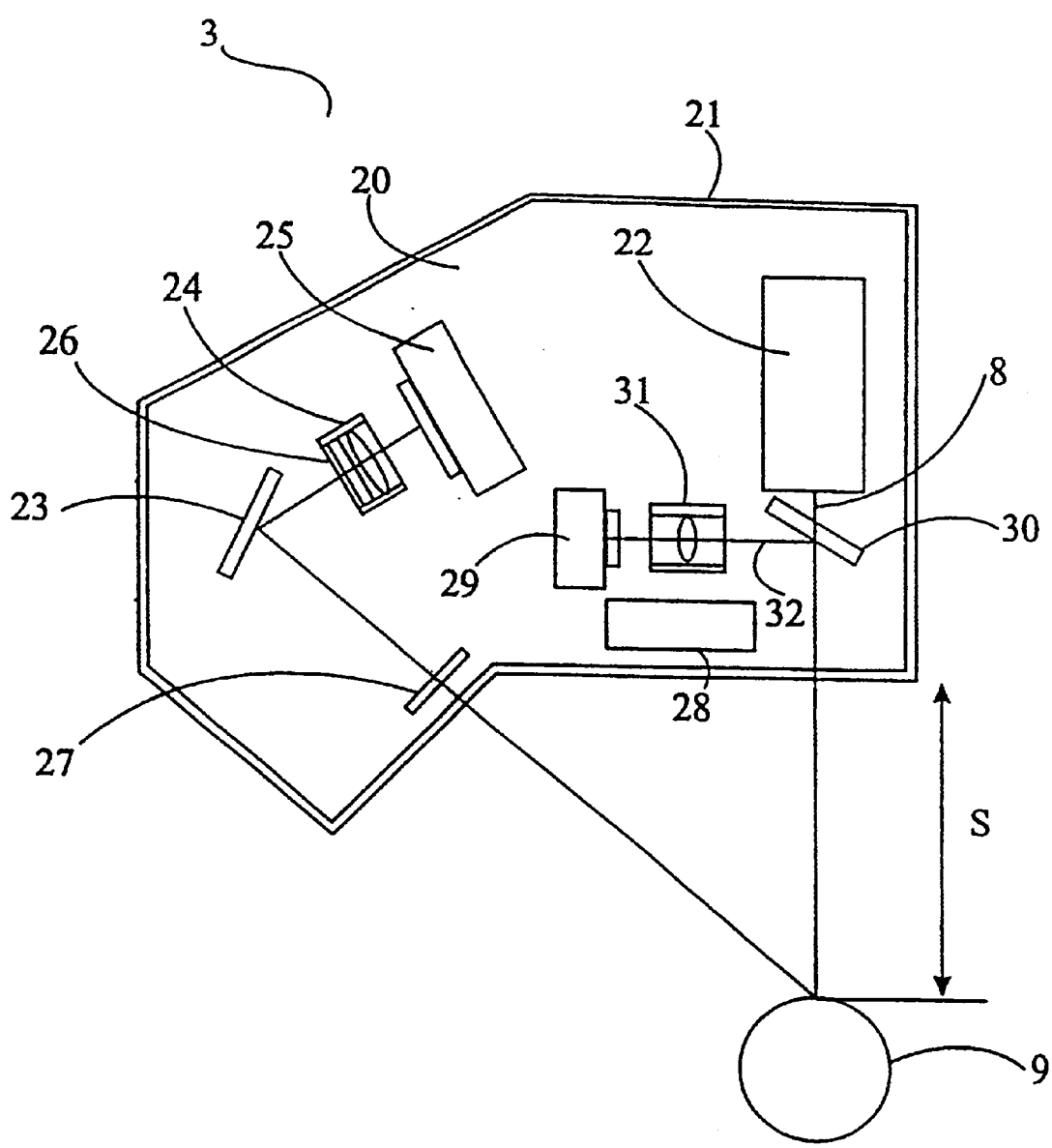
FIG. 4 illustrates a second embodiment of the configuration of the optical elements housed in a probe.

Referring now to FIG. 4, the second embodiment of the probe 3 is described. As also preferable with the first embodiment, the base plate is provided with a removable two-piece cover 21 mounted on the base plate 20 to define a housing for the components of the probe 3 to exclude ambient light and to protect the components. It may have a metallic interior coating to reduce electromagnetic emissions and susceptibility. The cover is appropriate for both embodiments.

The probe 3 in the second embodiment can also capture the colour of the surface of the object 9. The colour is captured using an optical system that is coplanar with the light stripe 8. The main advantage of coplanarity is that it provides the colour of each point directly whereas non-coplanar systems such as in the first embodiment require extensive post-processing computation to map the captured colour data onto the captured 3D data. In non-coplanar systems the whereabouts of the strip in the colour camera is significantly variable due to the non-alignment of the two cameras, leading to an embodiment which is operated for scanning in two passes: 3D and colour instead of the one pass which is achievable from the first embodiment.

During use, with the strip generator 22 switched off and the lamp 28 switched on a colour sample 32 of the object 9 is directed back along the direction of where the stripe 8 would be if the stripe generator were illuminated where it is reflected a half-silvered mirror 30 and focused onto the colour camera 29 via a lens assembly 31.

In a probe 3 where the stripe generator 22 produces a white stripe, the colour and position can be captured synchronously; the environment would need to be dark in this case and lighting 28 would not be required.

Figure 5A:
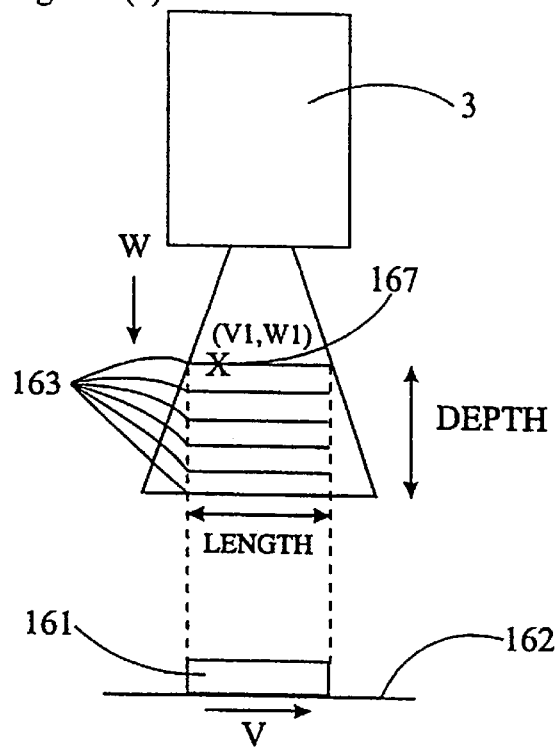
FIGS. 5a to 5d illustrate a method of calibrating the colour of the scanning apparatus of FIG. 1.
Figure 5D:
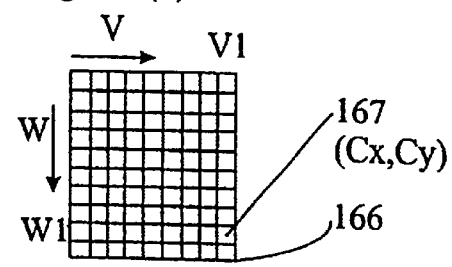
Figure 5B:
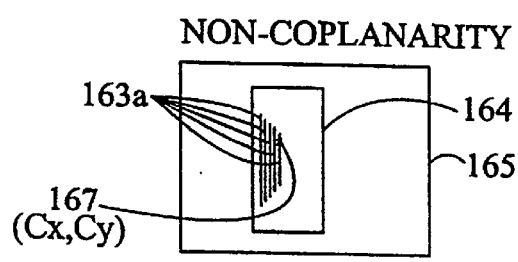
Figure 5C:
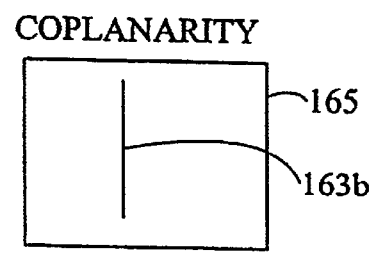

A look-up method is provided for determining where to read the colour from the rectangular array of the colour camera 29 depending on the object distance S at all points along the stripe 8. Now referring to FIG. 5, a colour camera look-up table 166 is prepared by viewing the stripe—when it is permanently illuminated—at a sufficient number of points in a rectangular array covering the distance measuring depth and the stripe measuring length. A fixed length, flat object 161 is one item that can be used for this purpose and it typically has a white surface. The flat object 161 is placed on a light stripe absorbent background 162. The probe 3 and the flat object 161 move relative to each other in the direction of the W axis such that stripes 163 are imaged. The colour camera image 165 shows the imaged stripes 163a collected in a region 164 of the array. In the case of perfect coplanarity, the imaged stripes will be superimposed (163b in FIG. 5c). The look up table 166 is then built up so that, for a scanned point 167 on an object with coordinates V1, W1 will have a colour image position Cx, Cy in the look-up table 166 which stores an array of values of Cx, Cy for the V, W ranges. During scanning, the colour image is usually scanned before the stripe measurement. The extent of the look-up table 166 can determine how much of the colour image 165 need be stored whilst the points are being calculated ie the extents of region 164; this reduces the amount of memory needed in the computer 4 and the required bandwidth for transferring colour information from the camera 29 into the computer 4, allowing the possible use of lower cost units such as the frame grabber 11 located in the probe control unit 5 or in the computer 4 on a bus as discussed above. It is probably not worth the expense of building a perfectly co-planar system as a roughly co-planar system can be calibrated as described above to produce as effective a result.

Figure 6:
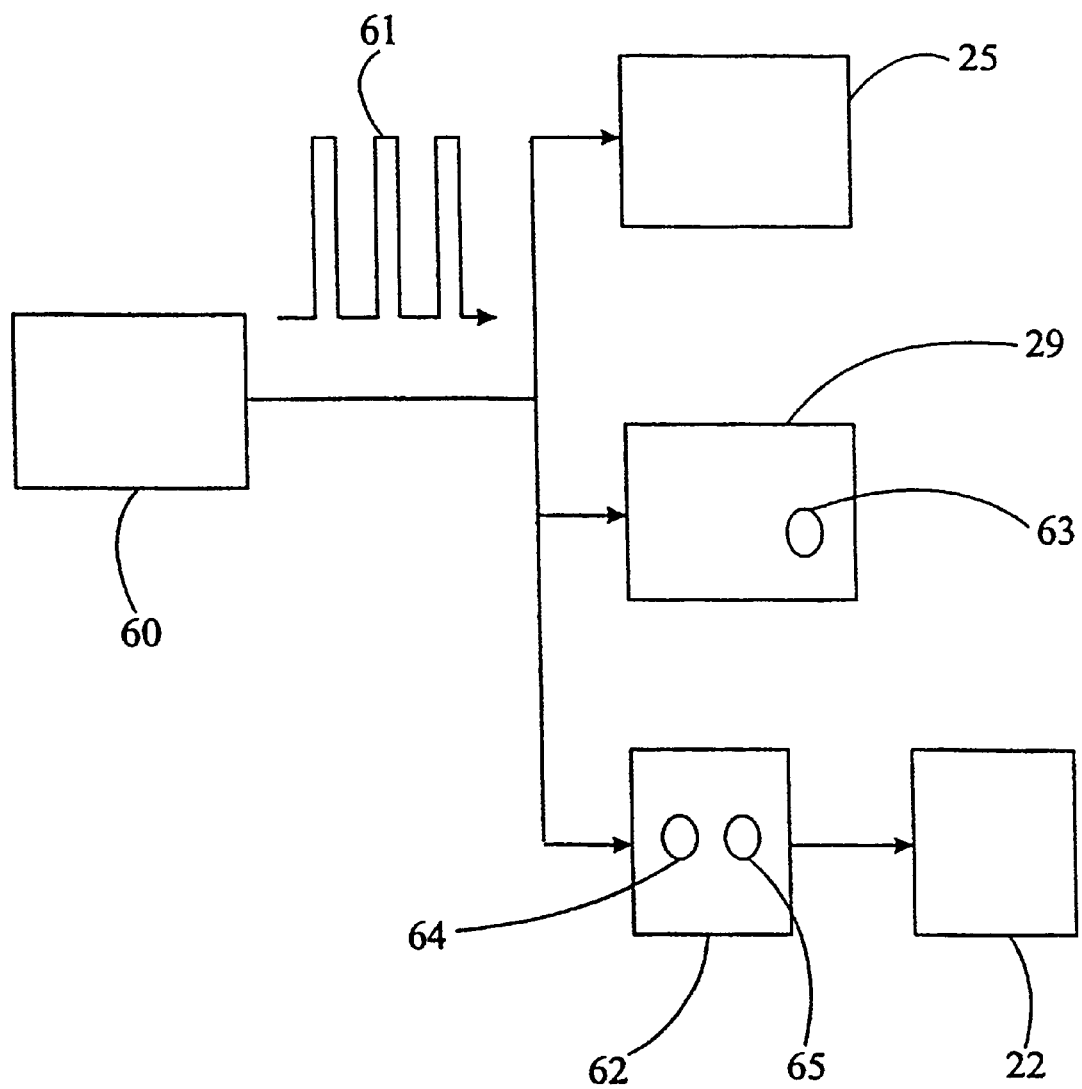
FIG. 6 is a schematic block diagram illustrating the capture of colour and position data.
Figure 7:
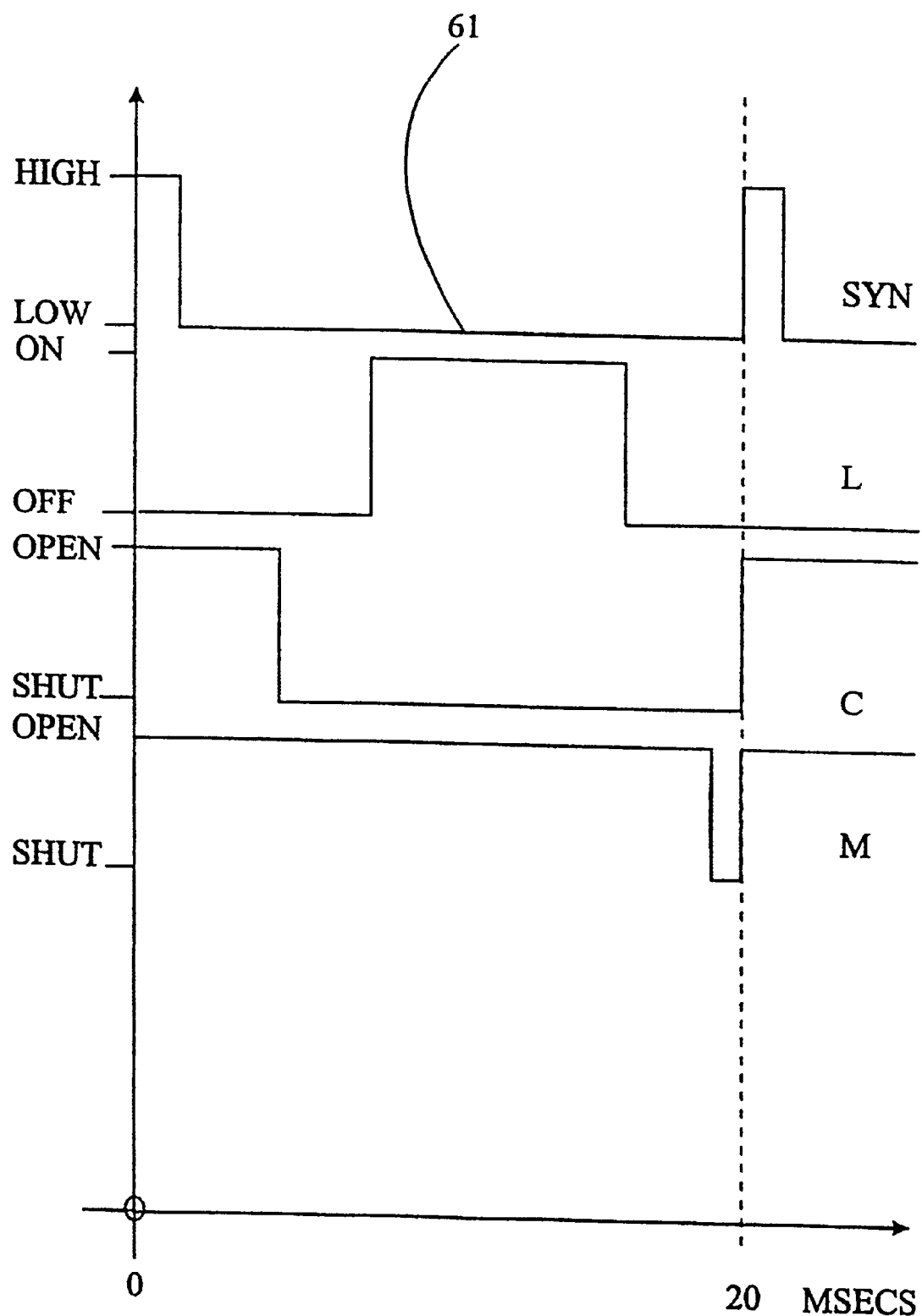
FIG. 7 is a schematic representation illustrating how the detection of the colour and position data is synchronised.

Referring now to FIGS. 6 and 7, on co-planar systems, if the light stripe 8 is of a colour other than white then it is difficult to capture the object's surface position and colour at the same time. To overcome this problem, the light stripe 8 and colour camera 29 can be switched on and off such that the colour is recorded shortly before or shortly after the position. Adjusting circuitry can be provided to change the exposure times of the colour camera 29 and the stripe generator 22 and to ensure that the gap between the colour capture and the stripe capture minimised. To achieve this, a video synchronisation generator 60 generates a synchronisation signal 61 of pulses at video camera rate—which using the CCIR format is 50 times per second. The synchronisation signal 61 is fed into the high resolution camera 25 and the colour camera 29. The exposure time of the colour camera 29 can be set manually using a switch 63 or remotely with an electrical signal. The synchronisation signal 61 is also fed into a standard circuit 62 which switches on the stripe generator 22 for a period of time after an initial delay. The period of time that the stripe generator is on may be set manually using a control 64 and the delay between when the synchronisation signal 61 is received and the stripe generator 22 is switched on may also be set manually using a control 65. With reference to FIG. 7, the synchronisation signal 61 is represented by the trace SYN. The illumination of the stripe generator 22 is represented by the trace L. The exposure of the colour camera 29 is represented by the trace C. The exposure of the high resolution camera 25 is represented by the trace M. This is only one way by example of controlling co-planar probes.

Figure 8:
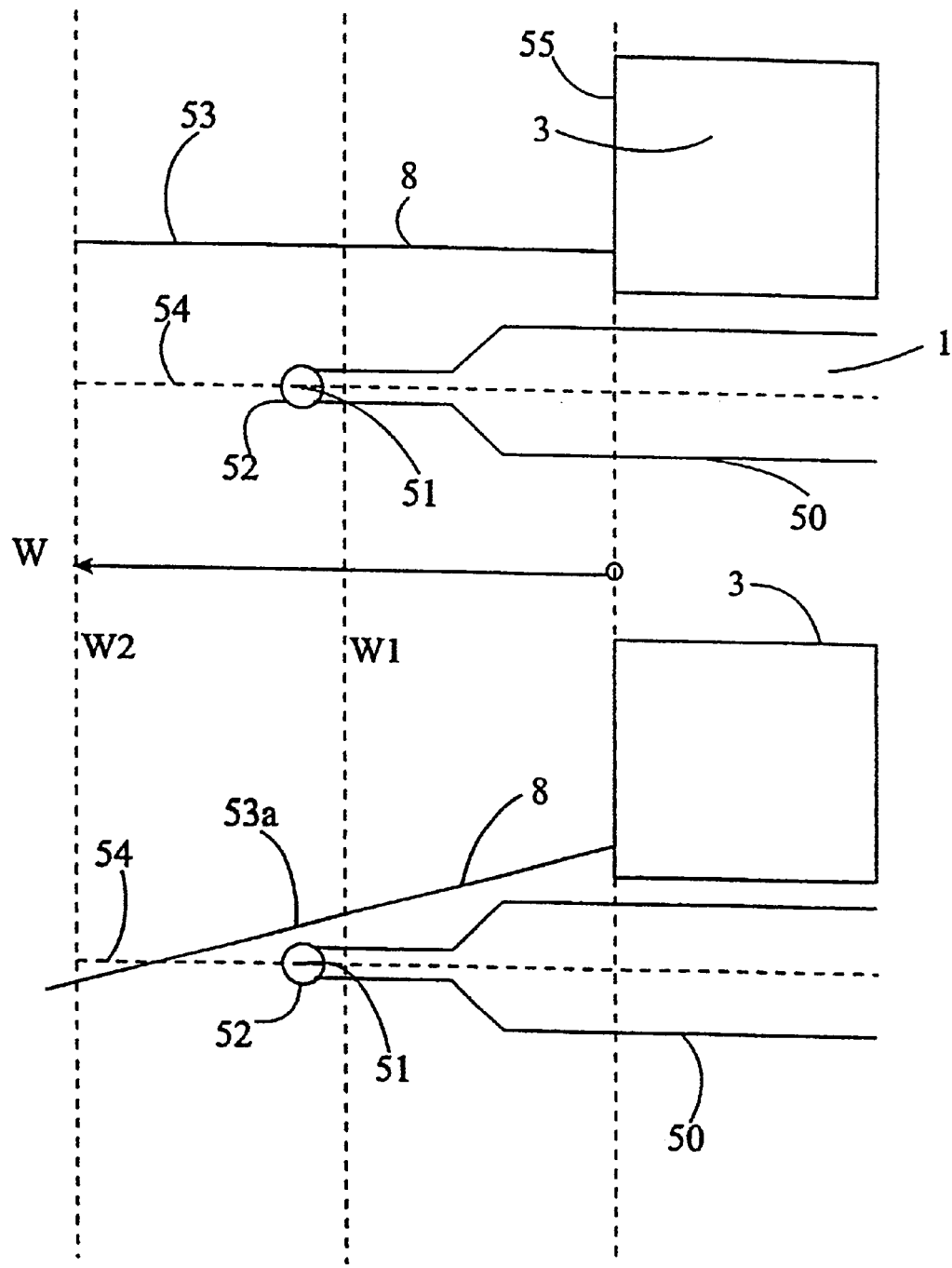
FIG. 8 is a schematic representation of the end of the multiply jointed arm of the apparatus of FIG. 1.

Referring now to FIG. 8, the probe 3 projects the stripe 8 so that the measuring area starts before a tip reference point 51 provided at the end of the multiply jointed arm 1 and extends a further distance. The tip reference point 51 may be the tip of a cone, a sphere or a rolling device such as a rolling wheel or ball or the point may be anything similar providing a tip. In the embodiment described herein, the tip reference point 51 is the centre of a sphere 52. This tip reference point 51 enables the operator to scan hard objects by tracing the sphere 52 along the object 9 in strips in contact with the object 9. For soft objects, the sphere 52 acts as a scanning guide and typical instructions might be to keep the tip reference point 51 about 20 mm from the object 9 whilst scanning. In this way the probe 3 may be kept close enough to the object 9 for the stripe 8 to be in the measuring area but without touching the soft object 9.

The stripe 8 typically starts 100 mm from the tip reference point 51 at the end of the arm 1 but could be much closer or further away, and can be used to measure objects lying between the two points W1 and W2 as measured from the end 55 of the probe 3. The idea method—from a usability point of view—is for the plane of the stripe 8 to be coaxial with the axis 54 of the last section 50 of the arm 1, and this is the case for a purpose designed arm and a hand-held probe. The probe 3 may often be retrofitted onto the arm 1 and because a mechanical arm has a diameter of typically 20–60 mm this presents an alignment problem. In this case, the plane of the stripe 8 is not coaxial but may be either in a plane 53 parallel to the arm end axis 54 or in a plane 53a angled to this axis 54 so as to cross the axis 54 at some point. By crossing the axis 54 of the arm 1 somewhere in the measuring range, the ergonomics of the arm 1 can be enhanced because the light plane is in an easier to use position. This crossover is typically somewhere between the tip reference point 51 and the end W2 of the measuring range.

Figure 9:
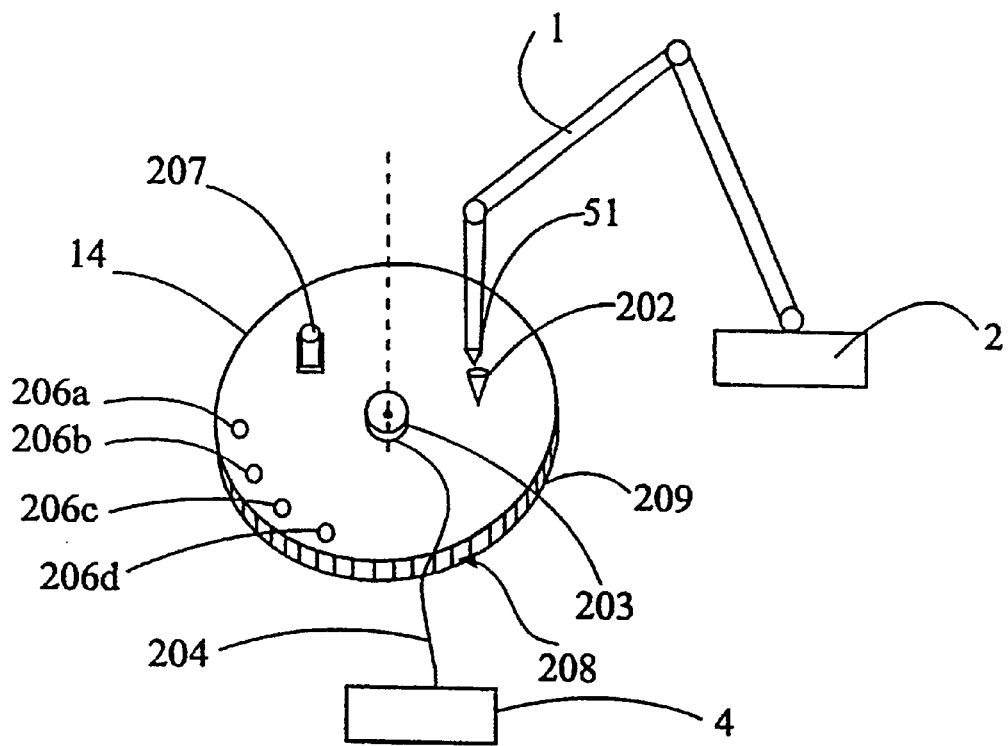
FIG. 9 is a schematic illustration of the turntable and multiply jointed arm of the apparatus of FIG. 1.

Referring now to FIG. 9, the use of a manually rotated turntable has several advantages. For a given arm size, larger objects can be scanned. The operator does not have to move round the object, this makes scanning physically easier, more enjoyable and there is less a chance of either the operator or the arm accidentally knocking in the object or of any reference point being lost.

The position and coordinate system of the turntable 14 must be known relative to that of the arm 1. The tip reference point 51 can be placed in a locating cone or cup 202 in the table at a large radius. Points are transmitted regularly by the arm control unit 2 and recorded on the computer 4 as the turnable 14 is manually rotated. Functions that fit a plane and a circle through these points provide complete position and orientation information on the turnable 14 in the arm coordinate system.

During scanning it is important to know the turntable angle. The turntable may be designed to have precise mechanical resting positions 206a, 206b, 206c, 206d, e.g. every fifteen degrees. These resting positions 206 would be apparent from a pointer 208 indicating the angle on an attached scale 209 of three hundred and sixty degrees. The operator could type in the new angle into the computer each time the turntable was rotated. However the process of typing in an angle means the operator may have to put down the probe 3 and this slows down scanning and there is scope for an error to be made by the operator.

With an electrical connection 204 between a position sensor 203 on the turnable 14 and the computer such that the computer could know either precisely or roughly the turntable angle, the process is faster and less error prone. If the sensor 20 is accurate—such as an encoder with, for example, 10,000 lines—then the turntable 14 could be positioned at any orientation and its angle known precisely. This allows for scanning whilst rotating the turntable although care must be taken that dynamics do not lead to position errors or to the object moving relative to the turntable. If the sensor 203 is less accurate—such as a potentiometer—then the turntable 14 could also have precise mechanical resting position 206. This gives the advantages of high accuracy and lower manufacturing cost. Each time the probe 3 captures data from the object 9, the software must check for movement of the turntable 14; if it has been moved then with a less accurate turntable sensor 203, probe data should be thrown away until the turntable 14 has stopped moving. In all case the turntable 14 should be capable of being operated by one hand such that the probe does not have to be laid down. It is often the case that an object on a turntable is scanned with regular increments e.g. 8 scans every 45 degrees. To aid the operator in incrementing by X degrees different shaped and/or coloured icons could be placed every X degrees on the scale and other other regular intervals. Typical intervals might be 45, 60, 90 degrees. With reference again to FIG. 2, this method can also be used with a probe 3 including one or more remote position sensors 261 with a tip reference point 51. The manual turntable may be driven by a motor operable by means of hand controls.

Each time a probe 3 is mounted on the arm 1, if the mounting is not repeatable to a high accuracy then the transformation in six degrees of freedom between the arm coordinate system X,Y,Z and the probe coordinate system U,V,W will have to be found.

Figure 10:
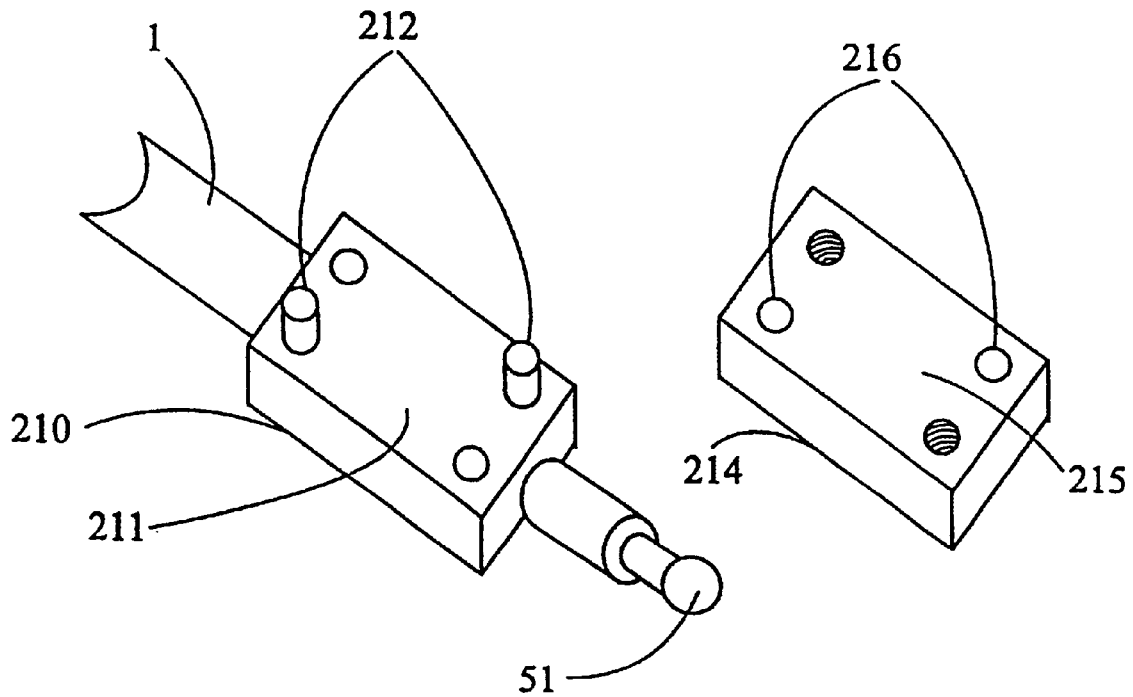
FIG. 10 illustrates the mounting of the probe on the multiply jointed arm.

A mounting device 210, 214 for the probe is illustrated in FIG. 10. Accurate and repeatable geometric positioning of the probe on the arm is required and this is provided by the mounting device 210, 214. The mounting device 210, 214 provides a standard mechanical interface which may preferably be used for all probes and arms and which is both small and light and which is easy to use to mount and dismount the probe onto and off the arm. The mounting device comprises a arm side mount 210 which comprises a flat mating surface 211 with two precisely dimensioned projections 212 located in precise positions on the mating surface 211. The mounting device also comprises a probe side mount 214 comprising a flat mating surface 215 and two precisely dimensioned recesses or holes 216 corresponding to the two projections 212 in the arm side mount 210. It is essential that the geometric repeatability in position and orientation is very high.

A standard mounting device between any arm and any probe several advantages. When the arm has to be used without the probe then the probe has to be removed. If the mounting device is not repeatable then the system will require realignment before use each time the probe is remounted.

Typically a range of probes will be supplied with different weights, speeds, sizes and accuracies corresponding to different functions. Each probe can be supplied with alignment data relative to the datum of the probe side 214 and in this way any probe may be attached to the arm without the requirement of re-alignment. A user may also have one or more different arms. In order to fit the same probe to two different arms, the user need only acquire an extra adapter for the second arm which would fit on to the arm and include the arm side mount 210 of the mounting device 210, 214. The arm side mounting device 210 may be attached to any machine including multiply jointed arms, horizontal arms and orientation devices such as manual, 2-axis orientation devices.

To calculate the six degrees of freedom transformation between the arm coordinate system and the probe coordinate system one can either treat it as one transformation or as a multiplication of two transforms if the accurately repeatable mount is considered as an intermediate reference point i.e. the transformation matrix Tap between the arm and the probe coordinate systems is equal to the transformation matrix Tam between the arm and the mount coordinate systems multiplied by the transformation matrix Tmp between the mount and the probe coordinate systems:

$$Tap=(Tam)\cdot(Tmp)$$

Figure 11:
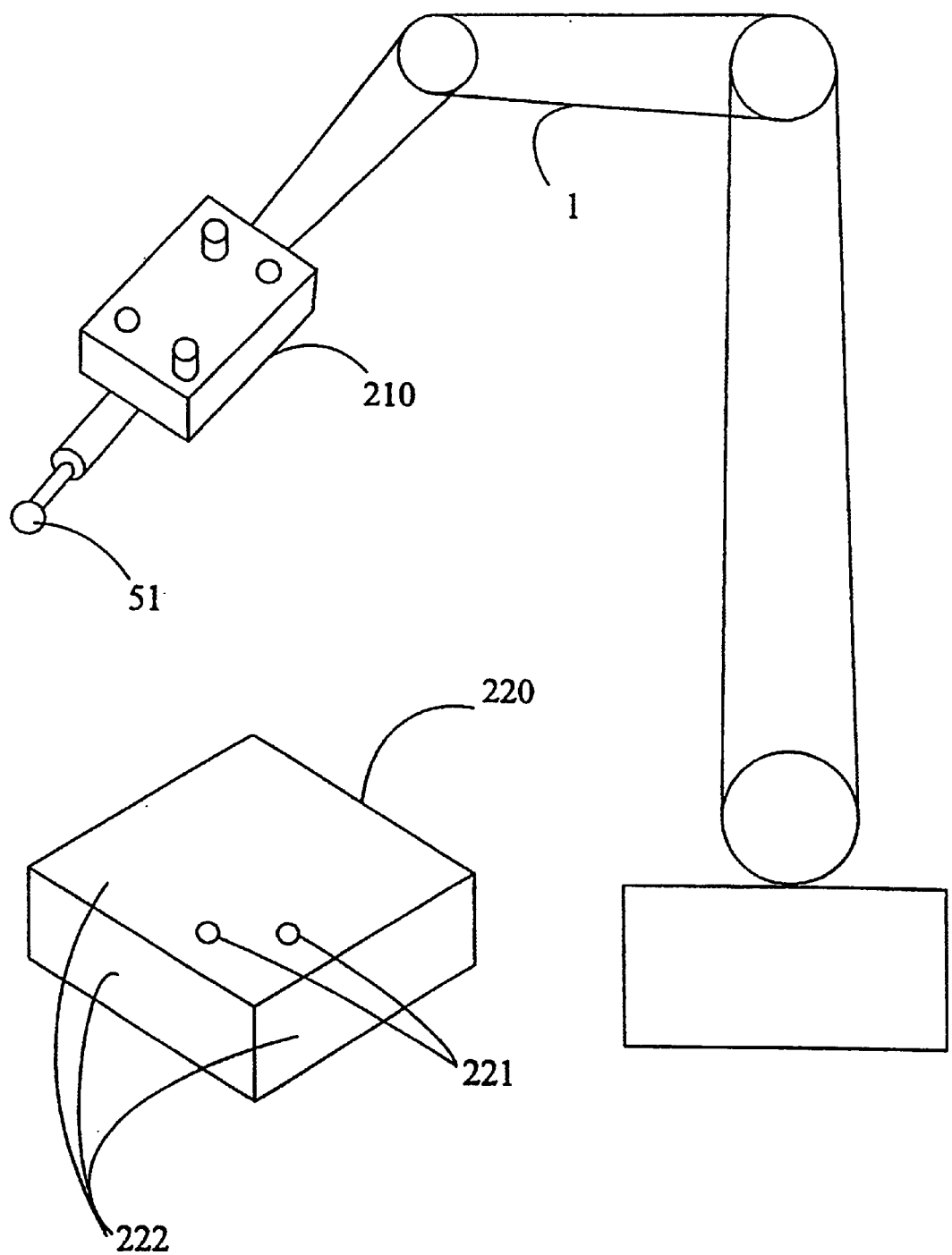
FIG. 11 illustrates the alignment of the mount on the multiply jointed arm.

The transformation matrix Tam can be found in several ways. Now referring to FIG. 11, a particularly simple, cost effective and practical method involves the use of a reference plate 220. The reference plate 220 has three orthogonal flat surfaces 222 and a mounting point 221 to which the arm side mount 210 can be attached in a precisely known position relative to the orthogonal planes. Tam can be calculated using the following steps:

The reference plate 220 is fixed so that it cannot move relative to the arm coordinate system, The arm side mount 210 is fixed rigidly onto the arm 1 (if it is not already present), without the probe attached.

The three orthogonal planes 222 of the plate 220 are measured by the tip reference point 51 on the arm such as to fully define the position and orientation of the reference plate, The arm mount is then mated with the mounting point 221 on the reference plate 220, The arm position and orientation is recorded, The transformation matrix Tam is then calculated from the known geometry of the reference plate 220 and the measurements from the previous steps.

The above method can be encapsulated in the main scanning software provided with the scanning system or in a separate program. This has the advantage that much time is saved over an alternative of the use calculating Tam manually from arm positions output by the arm manufacturer's software and manually inputting the resulting Tam into the main scanning system software.

The probe side mount 214 is integral to the probe and does not move relative to the probe coordinate system. The transformation matrix Tmp is provided by the probe supplier with the calibration data for the probe.

Figure 12:
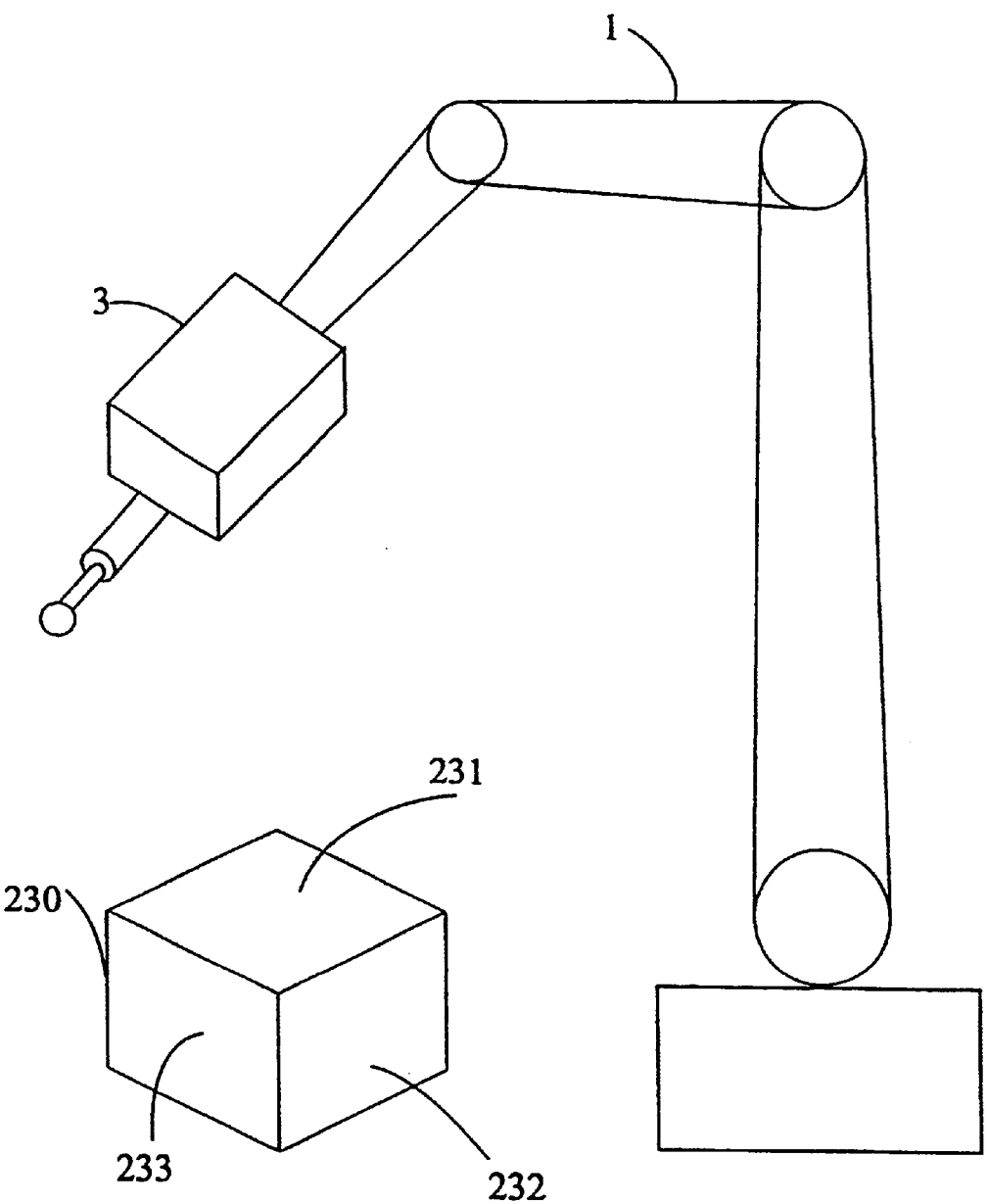
FIG. 12 illustrates the alignment of the probe on the multiply jointed arm.

The direct calculation of Tap using the arm and probe coordinate systems but without involving an intermediate mount can be carried out in many ways. Most of the ways involve using the probe mounted on the arm to capture data from one or more geometrical objects. The problem has proven to be very difficult since many of the standard methods produce inaccurate results in either the orientation or position components often due to inherent instabilities triggered by relatively small errors. One way is disclosed by example for s stripe probe:

Now referring to FIG. 12, the transformation matrix Tap is calculated by:
1. Mounting the alignment calibration object with three orthogonal faces 230 so that the three orthogonal flat surfaces 231, 232, 233 are reachable and accessible by the probe 3 mounted on an arm 1;
2. capturing at least three stripes from three orientations on the first flat surface 231—the orientations need to be different enough to provide stability to the mathematical algorithm (in practice, a variation of at least 5 degrees between every two of the stripes is sufficient);
3. repeating this three or more stripes capture on a second flat surface 232 and on a third flat surface 233; and
4. processing the data from the nine or more stripes in an iterative fashion to output Tap.

The handedness of the coordinate systems of the arm 1 and the probe 3 would be known. The relationship between the normals of the surfaces on the alignment calibration object 230 could be specified. One way of doing this is by labeling the three faces 231, 232, 233 and specifying the order in which the three faces must be scanned.

The main advantages of the above apparatus and its method of aligning the probe are: firstly, that it involves a single alignment calibration object that is cheap to manufacture to the required geometrical tolerance and is relatively light and compact; secondly, that the method is robust, simply to carry out from written instructions and quick; thirdly, the processing can be encapsulated in the main scanning software provided with the scanning system or in a separate system or in a separate program; fourthly, there is no need to have any preliminary geometric information about the orientation and position of the probe relative to the tip of the arm at the start of this method, for example the probe could be slung on the underside of the arm pointing backwards and the method would work and fifthly, if the probe is knocked or damaged such that Tmp changes but the calibration is still valid, then this method of alignment will still work.

In use scanning systems to provide data for 3D applications software, the need for specific 3D reference points in addition to 3D surfaces become apparent. Some applications for which 3D surfaces are required which also require 3D reference points are animations involving joint movements where a joint is to be specified in the context of the 3D model; in this case the joint can be quickly defined from one or more 3D reference points. A new method of using the scanning system is to use the probe 3 to scan the surface and to use the tip reference point 51 to capture individual 3D points by contact. An alternative method is to project a calibrated cross-hair onto the object and use an optical method of picking up individuals points. This can be used in both stripe and area systems. The calibrated cross-hair is usually switched on just during the period in which individual points are captured. There could be two modes: in the first mode individual points are captured each time a button is clicked and in the second mode a stream of individual points are captured from when a button is first pressed until it is pressed again. The second mode is commonly used for tracing out important feature lines such as style lines or patch boundaries. In the case of a stripe sensor instead of projecting a cross-hair it may only be necessary to project a second stripe at the same time as the main stripe. The cross-hairs may be calibrated by the probe supplied using a 3-axis computer controlled machine, a known calibration object and standard image processing techniques.

The scanning apparatus 100 is operable to scan an object and thereby generate a computer model of the object's surface using an intermediate data structure for efficiently storing points on the surface of the object during scanning, creating an instance of the intermediate data structure for the particular object, controlling the storage of the scanned points in the intermediate data structures during scanning with an operator control system.

Three examples of these intermediate data structures may be points or encoded stripes or range images.

Points have the disadvantage of being unorganised and much information obtained from the structure of the probe and the method of its use is lost if the 3D data is reduced to points.

In the case of stripe probes, much information may be retained to improve the speed and quality of construction of a model from intermediate data if an encoded stripe intermediate data structure is used.

Such a structure stores data from one stripe at one time. The stripes are stored in the order of capture. The time of capture of each stripe is recorded. The orientation of the probe is recorded for each stripe. The raw data points from the stripe may be processed before storing in the data structure to determine jump and break flags and to sample or chordally tolerance the raw data points to reduce the size of the intermediate data structure without losing any significant information.

In the case of area probes, the advantages of a range image as an intermediate data structure as well known. These advantages include a data structure that relates well to the area based data capture method and the efficiency of storage in an image in which only Z values are stored.

An intermediate data structure can be used in which the surface of an object is described by means of a finite number of linear and cylindrical range images that are to some extent characterised by the shape of the object.

Figure 13:
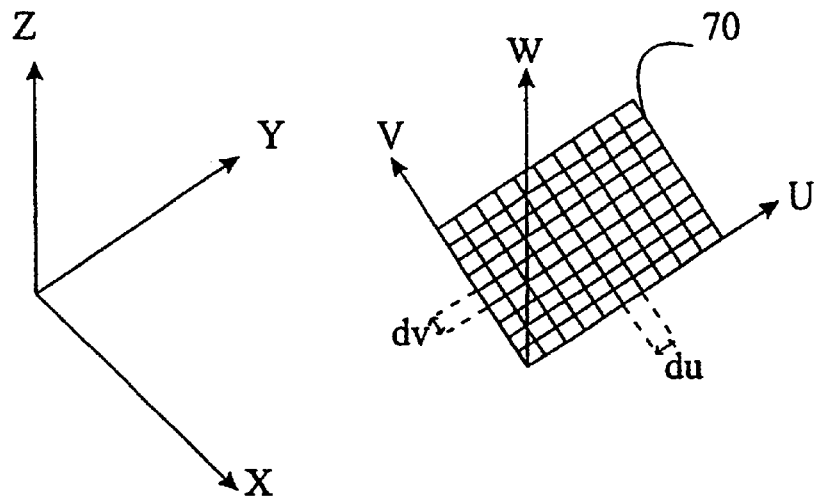
FIG. 13 illustrates a linear range image.

A linear range image 70 is illustrated with reference to FIG. 13. The range image 70 has a coordinate system U,V,W and a spacing of point dU in the U direction and dV in the V direction. The linear range image 70 contains in its header definition, its relationship to the world coordinate system X, Y, Z i.e. the arm coordinate system. In the disclosed invention, the linear range image 70 cannot store negative W values.

Figure 14A:
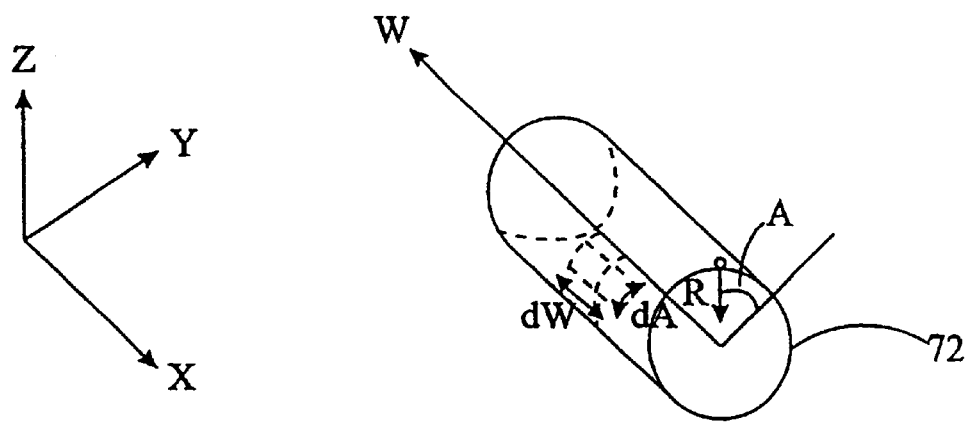
FIGS. 14a, 14b illustrates cylindrical range images.
Figure 14B:
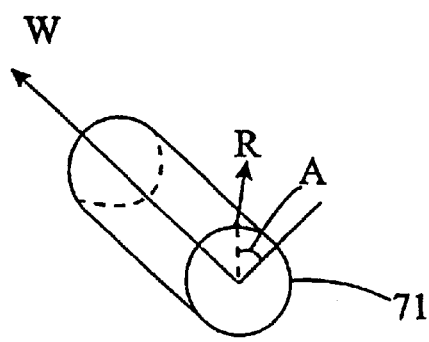

Cylindrical range images 71,72 are described in FIGS. 14a; 14b. The range image has a coordinate system W,R,A where A is an angle. The spacing of points is dW in the W direction and dA in the A orientation. The cylindrical range images 71,72 contain in their header definitions, their relationships to the world coordinate system X, Y, Z. In the disclosed invention, the cylindrical range images 71,72 cannot store negative R values. The direction +R and position R=0 of a cylindrical range image defines whether the points stored are inside the range image as in FIG. 14a or outside as in FIG. 14b.

Figure 15:
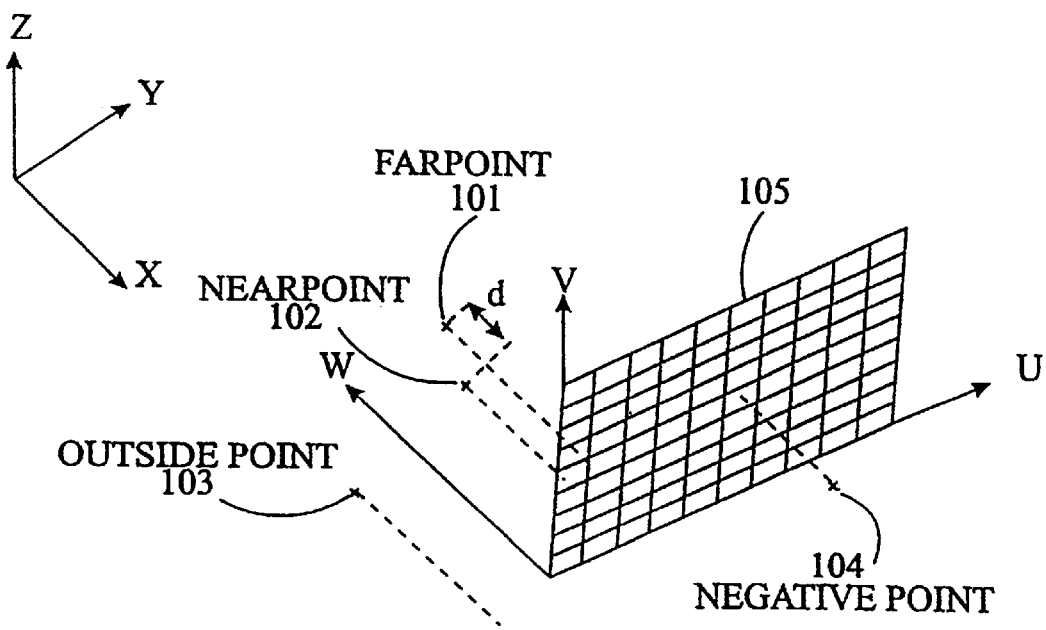
FIG. 15 illustrates the range image placing method.

Referring now to FIG. 15, the range image placing algorithm takes a scanned point and tries to place it into defined range images by projecting a ray along the normal to the range image 105. If the point has a negative value in a range image, for example point 104, then it is not stored in that range image. If the point is outside the extents of that range image it is not stored in the range image unless the range image is extensible in which case the algorithm extends the range image far enough to place the point. If a point already exists in the range image position in which the point is to be placed, then the two points are compared. If the distance between the two points in space is outside a tolerance d such as the error of the scanner, then the nearest point 102 is stored and the furthest point 101 rejected. If the two points are within the error of the scanner then their values are averaged and the average value is stored.

The range image placing algorithm is simple and quick but, it is indiscriminate, often placing points incorrectly in range images and relying upon them being overwritten by a nearer point. If the range image is very dense but populated with few values then up to half the points populated could be incorrect because the surface normal of the point is incorrect; this can restrict successful scanning to coarse range images.

Figure 16:
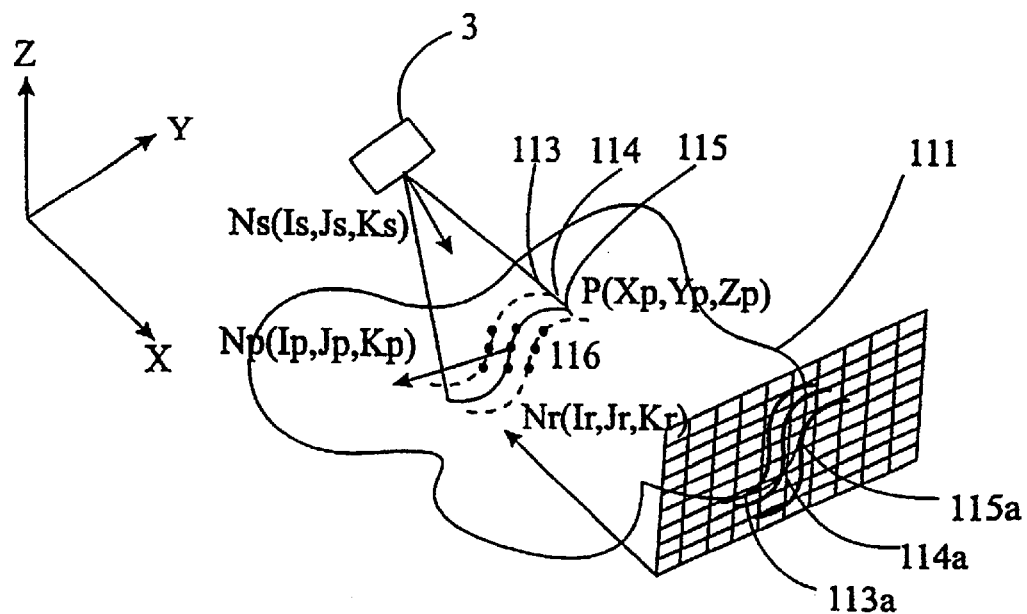
FIG. 16 illustrates the surface normal extension method.

The range image placing algorithm is improved upon with the surface normal extension. The range image placing algorithm does not have an estimate of the surface normal of the point to be placed; also, it does not take into account the orientation of the probe when the stripe is captured. To improve the range image placing the fact that most stripes are scanned in sequence and have near predecessor and near successor stripes is used. For example, as illustrated in FIG. 16, there are eight neighbouring points 116 on a stripe 114 and on its predecessor 113 and successor 115, and these can be used to approximate the surface normal of a point P before it is placed in a range image. Three sequentially scanned stripes 113, 114, 115 are shown on the an object 111 and projected onto a range image 112 as stripes 113a, 114a and 115a. The point P, with coordinates Xp, Yp, Zp on stripe 114 has eight near neighbours 116 on the respective stripes 113, 114, 115 as described above, and an approximate surface normal Np with coordinates Ip, Jp, Kp. The probe orientation for stripe 114 is $N_S$ with coordinate is, Js, Ks. By calculating the surface normals $N_S$, $N_P$, and $N_R$ where $N_R$ is the normal of the range image 112, one is given a choice of two, opposite surface normals; the correct one is the one that can be seen from the probe 3 orientation—assuming that the changes in probe orientation for the three stripes are not significant to the surface normal direction. If the surface normal NP of a point P is found to be facing away from the surface normal $N_R$ then the point is not placed on the range image. This surface normal extension eliminates the majority of incorrect point placements in range images. In a practical implementation, three stripes of points are buffered before the first stripe of points is placed in the range images. The normal extension in a modified form can also be used for the first and last stripes by using the two successive or two previous stripes. When the three stripes 113, 114, 115 are nearly coincident, perhaps because the arm is moving too slowly, then the accuracy of the surface normal estimate is low and the normal cannot be used. A difference normal calculation can be made using any neighbouring points already placed in the range image instead of the neighbouring stripes. A further, normal extension to the range image placing algorithm combines both the stripe and the range image data to provide a better estimate of the surface normal. The calculations involved in these normal extensions can provide a bottleneck to the scanning process. The bottle neck can be overcome by using only two stripes, less samples (5 instead of 9) or a faster computer.

Figure 17:
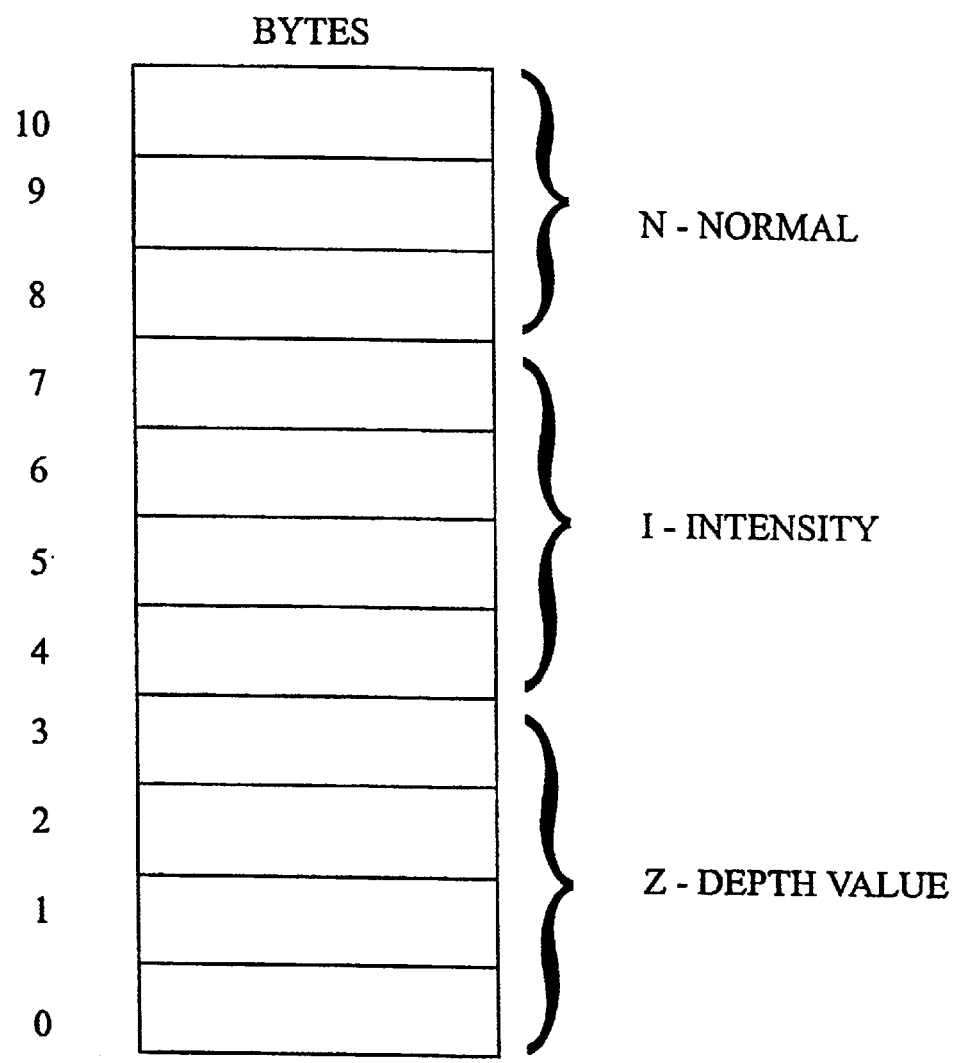
FIG. 17 represents the structure of a single point in a range image.

A number of range images that are positioned in the object coordinate system must be defined. The ranges images have specific mathematical definitions. Two basic types of range image are used: linear range images have specific mathematical definitions. Two basic types of range image are used: linear and cylindrical as discussed above. A range image has direction and a zero position. The range image can only store points that are in front of its zero position. If there are two more surfaces of the object in line with a point in the range image, the surface that is nearest to the range image's zero position is represented in the range image. A range image can be constrained in size or unconstrained in size. The range image can be one image fixed density or comprise a patchwork of a number of adjoining images of different densities. Each grid position in the range image is single-valued. The range image will typically use 4 bytes to store a depth value Z, from 1 to 4 bytes to store the greyscale or colour value I and from 1 to 3 bytes to store the orientation N. This is illustrated with reference to FIG. 17 which illustrates how a single point is represented. The 3 bytes suggested for orientation N will not permit a very accurate orientation to be stored. More bytes could be used but there is a trade-off between data storable size, processing time for converting floating number orientations to/from a compressed integer format and accuracy. Ranges will normally require from 5 to 11 bytes to store each point depending on the operator's requirements. For comparison, 20 bytes are typically required to store an ASCII X,Y,Z value.

Figure 18:
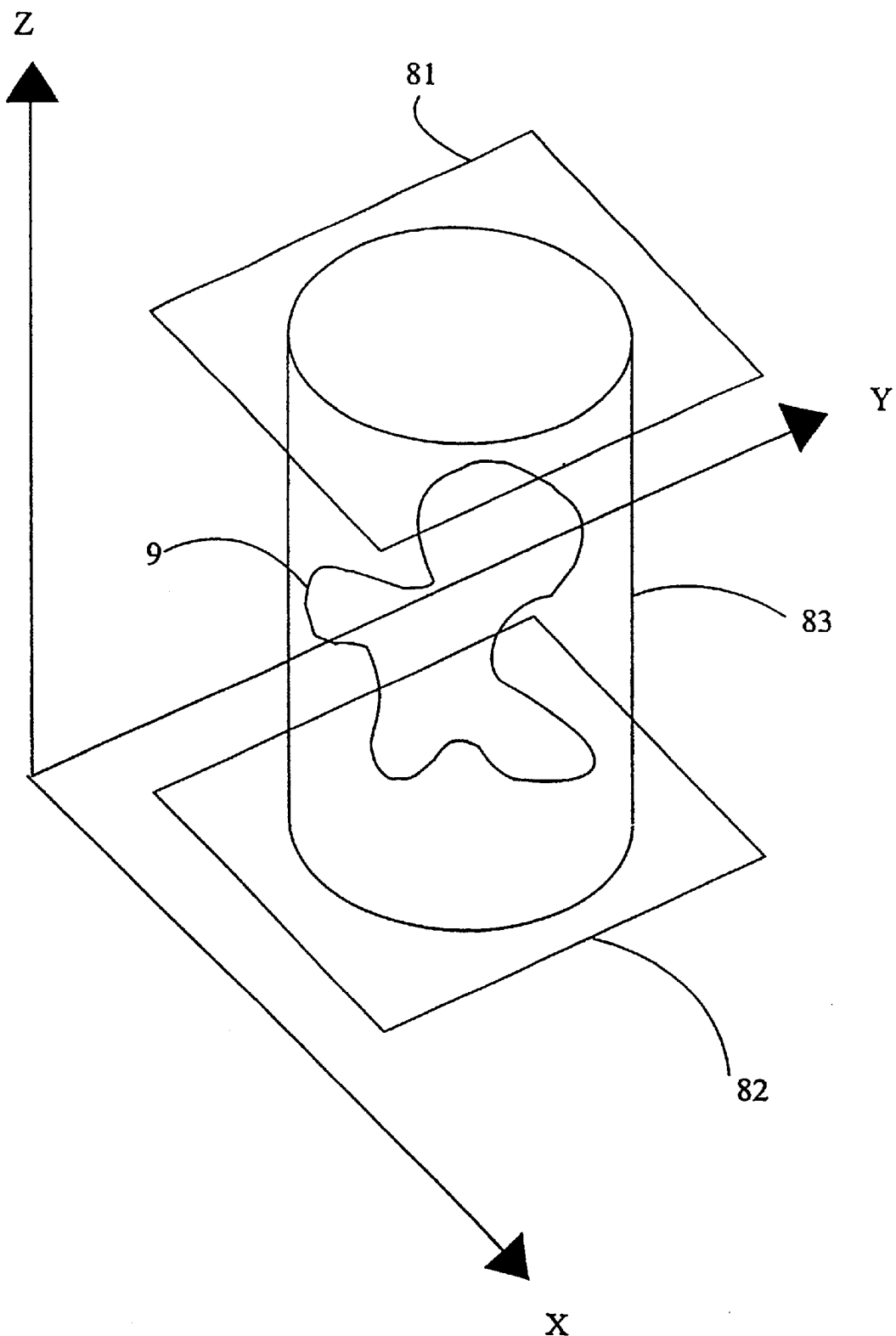
FIG. 18 illustrates the representation of an object by three range images.

Now referring to FIG. 18, it is possible to define—for a finite object 9 of any shape—a finite number of range images of the above types which for all practical purposes enable any and every point on the external surface of the object 8 to be stored in one or more ranges 81, 82, 83.

With objects with deep external features such as the inside of an ear, it may not be possible or practical to scan all parts of the external surface, but it is possible to represent them theoretically.

The number and position of the range images used in the process are such that they are sufficient to be able to store enough of the surface of the object to enable a computer model of the desired accuracy and detail to be generated.

In a manual process, the number and position of all the range images may be defined by the operator before scanning. Alternatively, just one may be defined by the operator before scanning begins followed by the definition of others at any point during scanning. The operator has a choice of several strategies: he can define range images and scan range one at a time. He can define a number of range images and scan simultaneously. He can define some range images and scan followed by defining more range images and then scanning. If a point is scanned that does not fit on to any defined range image then it is rejected. Alternatively, such reject points could be automatically saved for placing into any new range images that the operator may subsequently define.

A typical number of range images varies from 1 to 20. Some range images need only be very small in size, small enough to cover a part of the object that is otherwide hidden from recording on other range images. The density of each range image can vary, for instance a large, smooth part of the object does not need a high point density. But, a small, finely detailed ornament may require a high point density. Each range image has a direction.

The operator may select the most suitable set of pre-defined range images from a library of range image sets. He can then edit the set to suit his object. Each new set is then stored in the library. A set can be thought of as a set of templates. As an example, for a human form there could be a range image set consisting of 5 cylindrical range images for the limbs and trunk, together with 5 linear range images for the top of the head/shoulders, hands and feet. For a car, one cylindrical range image for the car's body and two linear range images at each end of the car could be enough. It is important to note that the axis of a cylindrical range image must lie within the object or part of the object being scanned.

A range image is manually defined by the operator by firstly selecting the appropriate range image type: cylindrical or linear and secondly, placing the probe to give the desired position and orientation of the range image and selecting it using the operator control system. For a cylindrical range image, the probe could be positioned to first give the position and direction of the axis and then to give the maximum radius.

Figure 19:
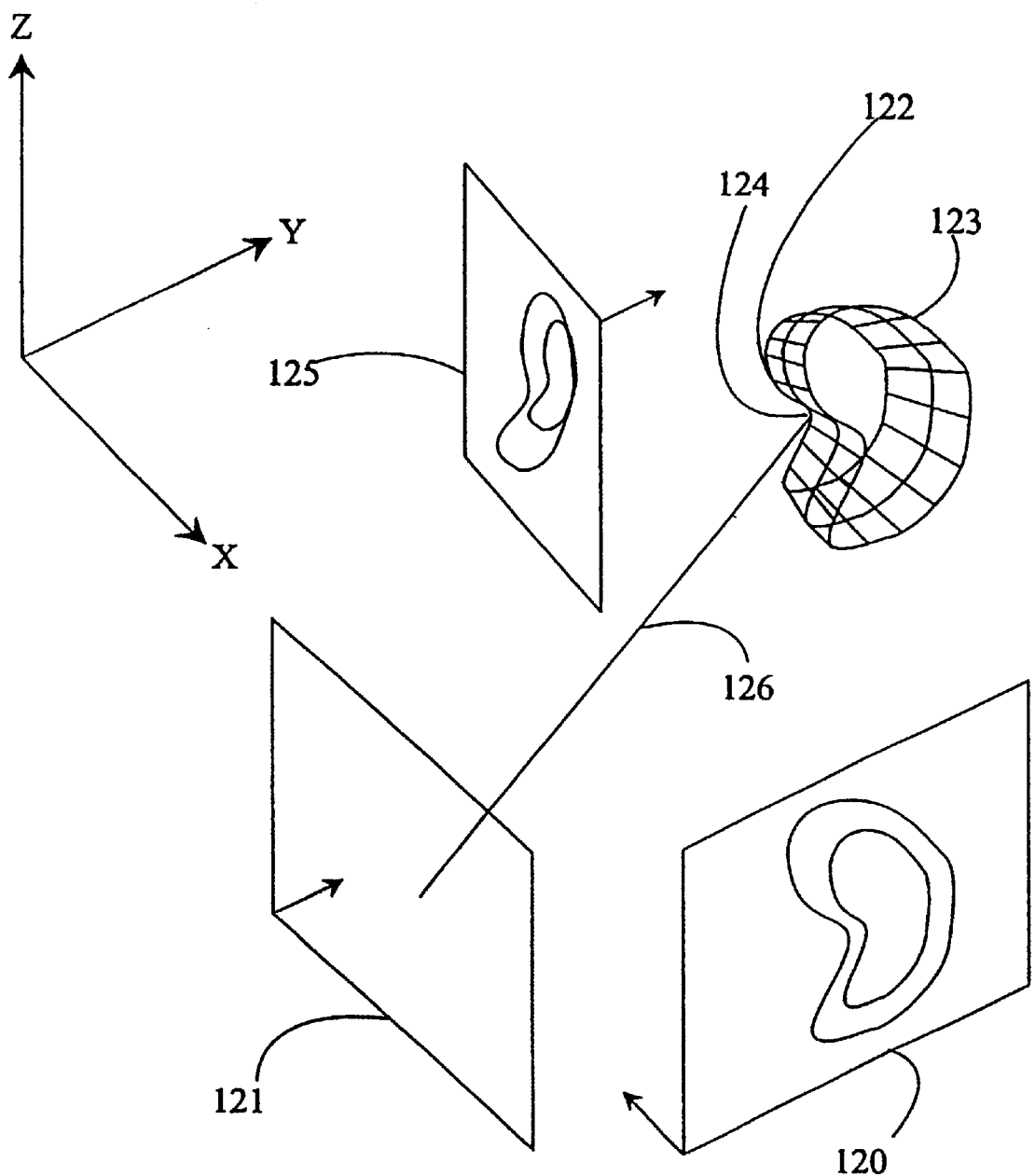
FIG. 19 illustrates the range image updating method.

Now referring to FIG. 19, an inference method is provided for updating range images from the other registered range images is also a novel method. The inference method progresses through each array position in the range image 121 that is to be updated. The inference algorithm can update positions that either have no value or have a value with a surface normal that is steeper than a given value or have a less steep value or any combination of these according to the operator's requirements. If a position in the range image 121 is to be updated, then that position is projected as a normal ray 126 onto all the other range images 120, 125, one at a time. If the ray intersects with another range image 120 then the local triangular surface element through which the ray first passes is located on the surface 123 and constructed. The value 124 at the intersection of the ray 126 and the triangular element 122 is then inferred and placed onto the range image being updated. If the ray intersects several range images 120, 125, then the infrared values from the range images are averaged after outliers have been removed. Outliers are removed by using a tolerance such as the error of the scanner. The original value (if it exists) in the range image being updated 121, could be included in this outlier removal/averaging process.

The interference method is particularly used when an additional range image is added at a late stage in the scanning process or if ranges images are defined/scanned one at a time. The method enables surface areas that are nearly orthogonal to the range image i.e. are almost vertical walls, to be well defined from data stored in the other range images. This provides a better set of points for carrying out the polygonisation of one range image resulting in a more accurate polygonal network and simplifying the polygonisation process.

The probe 3 provides data which is displayed on the display monitor 7 as a rendered polygonal surface 13 in real-time or with an acceptable delay such that the user can watch the display monitor 7 and use the feedback of the rendered surface to guide his movement of the probe 3. Real-time is defined in the context of visualisation as an operation reacting with a delay small enough to be acceptable to an operator in normal use. The probe 3 could be a stripe probe or an area probe. Where the probe captures 3D and colour information, then the colour information can be mapped onto the 3D model to texture it and this is discussed below.

The surface to be displayed is calculated for stripe probes one additional stripe at a time. Referring now to FIGS. 20a to 20g, as a stripe 301 is captured it is converted using one of several commonly used methods into a finite string 303 of 3D points 302a, 302b, and flags 304, 305 in the world coordinate system X,Y,Z using the previously obtained calibration and alignment data for the probe 3. The maximum number of points is usually equal to the number of rows 281 or the number of columns 282 in the CCD array 25 depending on the orientation of the CCD in the optical setup. This disclosure will refer to rows but it can equally apply to columns or any other way of organising the data recorded by the camera. Where the stripe crosses a row the position on the CCD array can usually be calculated to sub-pixel accuracy by one of several commonly used methods. If there is no data for one or more neighboring rows such as missing positions 302e, 302f (not shown) then a 'break' flag 304 is output into the string to indicate a break in the surface recorded. If there is a significant jump discontinuity in range above a maximum value which is appropriately set for the scanning resolution of the probe 3 such as between 302j and 302k then a 'jump' flag 205 is output into the string of 3D points to indicate either a vertical wall relative to the probe orientation or an occluded surface. The string 303 is filtered to reduce the number of points whilst effectively transmitting most of the information. The object of filtering is to reduce the amount of data processed for surface rendering and hence increase the speed of the rendering process with a minimal degradation in the quality of the surface. The first method of filtering is to skip some of the stripes. Another method is to sample the rows e.g. take every nth row. A third method is to chordal tolerance all the points in the stripe and discard the points that are surplus and within tolerance. Where computer speed is limited, the first and second filtering methods are preferred because of their simplicity and because the resulting regular grid of points produces regular polygons that look good on the display as opposed to long thin polygons that might result from a chordal tolerancing process that can have rapidly changing surface normals if the data points are slightly noisy due to inaccuracies in the probe and the arm and may present an unattractive orange peel effect on the display. The same process is repeated for a second stripe 306 capturing data points 307 resulting in a second string 308 of 3D values 307a, 307b etc. and flags. A surface comprising triangular or quad polygons is then constructed between the two strings 303 and 308 resulting in a string of polygons 309. The string of polygons are then displayed by a renderer. The renderer may or may not take into account the previous polygons displayed, the viewpoint and lighting model.

If colour has been recorded for a polygon then the colour information can be mapped onto the polygon. The precise mapping algorithm depends on the format of the raw colour information which depends on the design of the probe. The raw colour information may comprise point, line or area samples. The raw colour information may be adjusted before mapping using colorimetric calibration and intensity calibration data. During the mapping process the colour information may be adjusted for the probe to polygon distance at point of colour capture and polygon orientation to probe at point of capture. The basis for the adjustments is a set of calibration procedures carried out for each individual probe.

The viewpoint for the surface displayed can have a constant position, zoom and orientation in the world coordinate system of the object such that as the probe is moved, the surface displayed increases where the data is captured; the viewpoint is set before scanning starts either with an input device such as buttons on the arm, footpedals, a mouse and keyboard or using the probe to determine the viewpoint. Alternatively, the viewpoint can have a constant position, zoom and orientation in the probe coordinate system such that as the probe moves, the surface is completely rerendered at regular intervals, each time with the new surface displayed where the data has been captured with the regular intervals being at an acceptable real-time rate such as 25 displays per second or less often. Alternatively, the viewpoint can have a constant position, zoom and orientation in the world coordinate system where the surface displayed increases where the data is captured that is completely updated to that of the probe coordinate system on operator demand such as by the depressing of a button or footpedal or at regular time intervals such as every 10 seconds. The different methods for updating the viewpoint provide different advantages depending on the size and type of the object being scanned and the speed of the computer in recalculating the surface display from a different viewpoint.

Figure 21:
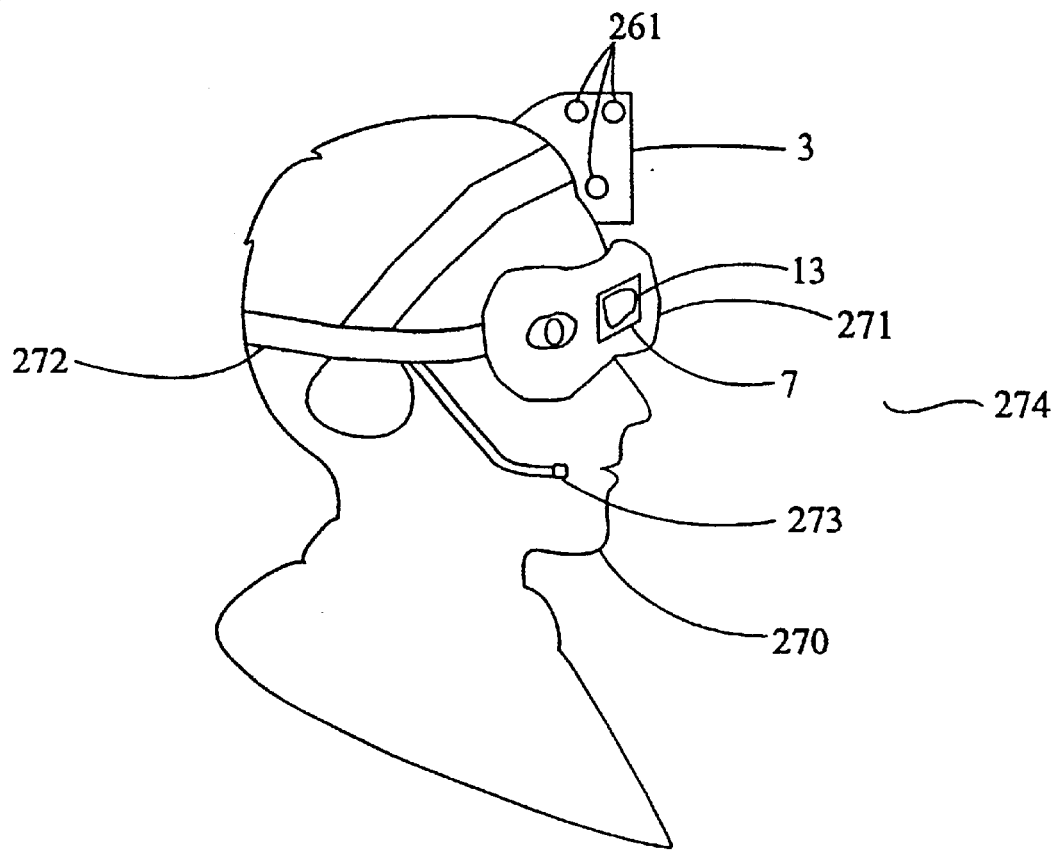
FIG. 21 illustrates a probe mounted on a head and a head-up display.

Referring again to FIG. 2, the display 7 can be mounted on the probe 3 such that the rendered surface 13 or other image displayed moves with the probe movement. Referring now to FIG. 21, the display 7 could be mounted in front of the operator's eyes as part of a head-up display 271 which may or may not also allow the operator 270 to see his real environment as well as the rendered surface 13 or it can be mounted elsewhere. In practical use it is found that the operator watches the rendered surface 13 on the display 7 whilst scanning because this has the important advantage of ensuring that all the object is scanned. In some applications such as scanning large objects or using a turntable to rotate the object, watching the display 7 as a large display monitor situated on a workbench can be advantageous. In other applications such as scanning a spherical type object a display screen on the probe 3 is advantageous because the operator moves with the probe. With sufficient quality in a head-up display and with no negative effects such as feeling sick, a head-up display may be best for nearly all applications because it is feeding back most directly to the operator.

Referring again to FIG. 2, it is already technically possible to integrate the display 7 with the probe 3 as for instance a colour LCD screen is small, lightweight, real-time and flat whilst having sufficient resolution to render the surface so that the operator can see what has and what has not been scanned. A display mounted on the probe could be tiltable in one or two axes relative to the probe. The ability to tilt the display relative to the probe can give the operator improved ability to scan in spaces with poor visual access. Buttons 6 on the probe can be used to navigate menus and select from menus.

As computing power becomes faster and more compact it will be possible to encapsulate the computer 4 in the probe 3 as well as having the display 7 mounted on the probe. The probe might have memory 262 which could be both dynamic memory and magnetic memory such as a CD-ROM or digital video disk (DVD). The probe might have a local power source 260 such as batteries. This would be the case with one or more remote position sensors 261 mounted inside the probe. Although one remote position sensor is sufficient, more accuracy is obtained by averaging the positions coming from three or more remote position sensor. Another benefit of three or more sensors is that when a spurious position is output by one or more sensors this can be detected and the data ignored. Detection of incorrect positions is by means of comparing the positions output by the three sensors to their physical locations within the probe to see if the variation is larger than the combined, acceptable error of the sensors. Since remote position sensor technology is likely to remain much less accurate than multiply jointed arm technology, it is preferably that probes with remote sensors use array scanning means rather than stripe scanning means. With a single array scan all the data in the array (ie a range image) is accurately registered to each other but with stripes there are position errors been any two sequential stripes. It is possible to use an integrated close points (ICP) algorithm on overlapping range images to substantially reduce the errors caused by the remote position sensors but this is not possible with stripes.

A number of different technologies exist for area probes including binary stereo, photometric stereo, texture gradients, range from focus, range from motion, time of flight, Moire interferometric and patterned structured light systems. The most common systems in use in industrial applications are time of flight, Moire and patterned structured light. Different area probe technologies have different advantages and disadvantages for manual scanning.

Time of flight systems use a modulated laser spot to measure a scene by the phase shift between outgoing and reflected beams which is proportional to the range of the object point; a complete range image is captured by scanning the whole region of interest. For a small area this technique is advantageous since it is line of sight although the accuracy is generally of the order of 1–2 mm unless multiple measurements are taken at each point thus reducing scanning speed significantly. It is thus too slow.

Moire systems use gratings in front of projection and viewing optics to produce an interference pattern which varies according to local changes in height on the object. Absolute measurements and measurements accross discontinuities are only possible by taking several measurements with different grating configurations or from different project angles. For relative height measurement these systems offer high accuracy. It is thus too problematic obtain absolute measurements.

A depth from focus range area sensor has recently been demonstrated which allow the real time determination of range from pairs of single images from synchronised cameras albeit with the use of relatively complex hardware. It is thus too complex to use at this point in the development of the technology.

Referring now to FIG. 29b, patterned structured light systems come in many families and rely on projection of a light pattern and viewing off-axis from the projection angle. Synchronously scanned laser triangulation probes can be raster scanned over a 2D area. A laser stripe triangulation line can be scanned in one direction to produce area measurements. Scanning can be mechanical or electronic. Multiple laser or light stripes 363 can also be simultaneously projected over an object to obtain the same effect as a scanned stripe but this has the disadvantage that in a single image it is not possible to differentiate between the stripes. To overcome this problem a number of systems use a gray-coded sequence of binary stripe patterns which solves the ambiguity problem but the sensor should remain stationary during the capture process. An alternative solution is the projection of colour coded light stripes which allows the unambiguous determination of range even with depth discontinuities from a single image. Note that the simultaneous use of a number of stripes is herein classified as an area technique and not a stripe technique.

The simultaneous projection of colour coded light stripes overcomes the disadvantages of the previously described systems and is the preferred area embodiment of this invention. Each stripe is one colour. Each colour may be a discrete wavelength such as provided by a number of different laser diodes or a subset of a spectrum range of colour generated from a white light source. Either all the colours may be unique or a small number of colours may repeat; the repetition of a small number of colours can lead to ambiguity if stripes of the same colour are not sufficiently separated.

The probe encapsulation would have advantages in terms of cost reduction and complete flexibility in freedom of use because even cables may not be required and the only limits would be the range and accuracy of the remote position sensor.

If an arm is being used as the position sensor, the probe with a display mounted on it might receive its power along a cable which may follow the path of the arm and the computer may be suited in the base of the arm which would reduce the weight of the probe and reduce operator fatigue.

Referring again to FIG. 21, if a head-up display 271 is being used, the probe 3 with one or more remote position sensors 261 could be mounted on the operator's head 270 with fixing means 272 to produce a head-mounted scanning system 274. This would lead to hands free scanning, although some method of navigating menus e.g. verbally with speech recognition by means of a microphone 273 or via buttons would be important in practice. It is likely that the stand-off from the probe to the object using a head-mounted scanning system 274 would be quite large for example 250 mm but it could be more or less.

There are several ways of automatically polygonising intermediate data to form a 3D polygonal model. Two ways are described: strip polygonisation and range image polygonisation.

The strip polygonisation of intermediate data to automatically create a polygonal model is described for a stripe scanner. The following description is by means of an example and comprises the following steps:

1. Take the intermediate data in the order in which it is scanned including the probe orientation for each stripe. For a stripe probe this will typically consist of a number of neighbouring stripes with occasional discontinuities such as when the scanning process is paused or a turntable is turned or the direction of scanning is reversed. The intermediate data is preferably in an encoded stripe form as described above.
2. Group the data into stripes of similar probe orientations and no discontinuities. An acceptable variation of the probe orientation in a group of data may be ten degrees. The average normal for each set of stripes is specified. A new group is started each time a discontinuity appears or when the probe orientation varies unacceptably.
3. If not already done in the intermediate data, filter the stripes in each group using a chordal tolerancing routing to reduce the quantity of points and maintain the positions of the break and jump flags.
4. Use a 2.5D polygonisation method to polygonise each group. This will result in a number of 2.5D polygonal meshes. There may be holes in any of the meshes. The method eliminates occluded surfaces behind surfaces resulting from variations in the probe orientation within the group.
5. Use a polygon mesh integration method such as an implicit surface method to integrate the 2.5D polygonal meshes into a computer model comprising one or more 3D polygonal meshes.
6. If required, use the known base plane of the object specified during the scanning setup to automatically close the bottom of the model where the object could not be scanned because it was resting on a table or turntable.
7. If required, use a general closing function to automatically close all holes in the model.
8. If required, use a smoothing function set such that features created by known levels of inaccuracy in the 3D scanning process are smoothed out and features greater in size than the inaccuracy of the system are maintained.
9. Convert the internal polygon format into an output file of a commonly used polygon file format such as DXF.

The range image polygonisation of intermediate data to automatically create a polygonal model is similar to strip polygonisation. Each range image is effectively a group of stripes with the same surface normal. Steps 1 and 2 above are therefore not needed. There are two ways of carrying out the equivalent of step 3 above. Range image data may be chordal toleranced as a series of stripes as described in step 3 and the polygonisation process continued with steps 4 to 9 as required. In the second way, given the greater structure of a range image over a group of stripes, steps 3 and 4 may be combined and a range image tolerancing algorithm combined with a 2.5D polygonisation algorithm and the polygonisation process continued with steps 5 to 9 as required.

Area scanners usually output range images. In general, range image polygonisation is better suited to area scanners and strip polygonisation is better suited to stripe scanners. If the intermediate data structure is range images then the range image polygonisation will work whether each range image relates to a particular data capture instant or is part of a defined range image structure that is characterised by the shape of the object.

The combining of colour data onto the 3D model is known as texture mapping.

Before raw colour data in the form of colour images can be texture mapped onto the 3D model, it must first be corrected by means of various calibrations.

An important calibration is the geometric calibration of the colour camera and finding the alignment transform of the colour camera to the calibrated 3D measurement system in the probe. Without these calibrations/alignments neighbouring colour samples when mapped together will produce visible errors. The objective of these calibrations is to get the geometric errors much smaller than those of the arm accuracy. The first geometric calibration is to take out lens distortion; standard means are used for this based on imaging geometric objects of known size and extracting pixel coordinates using standard image processing techniques. The second is to create the camera model; a simple pinhole model can be used or a more complex model; standard means are used for this based on imaging geometric objects of known size from different distances and extracting pixel coordinates using standard image processing techniques. The third is generating the alignment transform; a method has been developed based on 3D and colour imaging geometric objects of known size using the probe. For all three methods a 3-axis computer controlled machine is used to ensure precise distances. The probe engineering must be geometrically stable enough such that this transform will only be recalculated rarely such as after the probe has been dropped or damaged.

Much of the effect of distance from the probe to the object on recorded light intensity can be calibrated out. A diffuse, flat, white surface is imaged normal to the camera asix at a number of different distances from the probe to the surface. The distances are chosen to cover the whole scanning range from closest point to furthest point. The variations in mean intensity recorded in the camera are used to calibrate the probe with distance. This calibration data is used to correct the colour data recorded when scanning an object such that all colour data is corrected to a known distance equivalent.

Much of the effect of tilt of the surface from the camera axis on the colour quality can be removed but the effectiveness of this depends on at least the surface reflectance for each colour. A diffuse, flat, white surface is imaged at various angles to the camera axis at a fixed distance from the probe to the surface. The angles are chosen to the point at which there is significant deviation from the Lambertian model. The variations in mean intensity recorded in the camera are used to calibrate the probe intensity with relative surface angle to the probe. This calibration data is used to correct the colour data recorded when scanning an object such that all colour data is corrected to a normal equivalent.

A standard colorimetric calibration is carried out using reference colours such as Macbeth charts which are mounted normal to the colour camera axis at a known distance from the probe. Corrections are made to a commonly used colour standard such as the CIE. Individual pixels in the camera may be colour and intensity corrected.

Some of the above calibrations vary little amongst probes manufactured to the same design. This is probably due to tight manufacturing tolerances. The calibration information can be incorporated into the software as for example constants or tables or equations for the probe design. Others calibrations are carried out once on the setup of each probe after manufacture. Other calibrations could be carried out each time the scanning system is used, for example the scanning of a white surface at a known distance will set the lamp intensity relative to the intensity when the bulbs were new.

Figure 22:
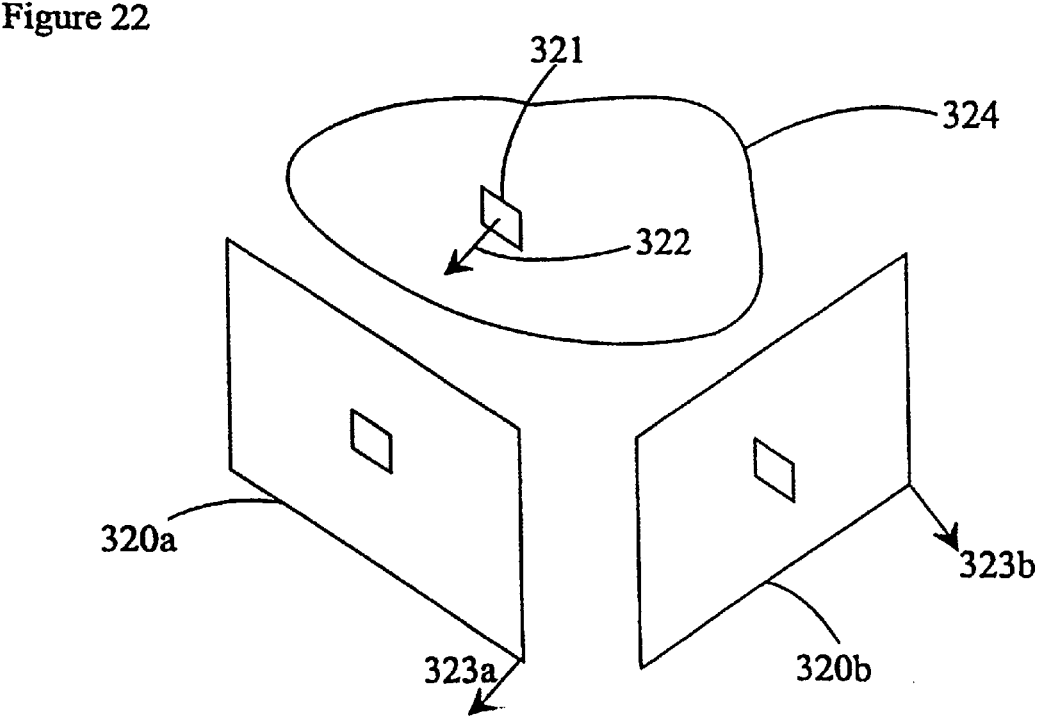
FIG. 22 illustrates colour image mapping.

Referring now to FIG. 22, there are several methods of mapping colour images 320 onto the 3D model 324 to form texture maps. Surface elements on the 3D model may be flat polygons or elements of a high-level surface form. A mapping method for colour images is:

1. Each colour image 320 is corrected using calibration and geometric data.
2. For each surface element 321 the colour image whose normal 323 is closest in orientation to the normal 322 of the surface element 321 is selected (the master image) and the texture map coordinates for that surface element go to the mapping of that surface element onto that master image. The closest image normal is that of 320a in this case.
3. The other colour images that map onto the surface element are then processed. If the surface normal difference between the surface element and a colour image is above a certain tolerance, then that image is ignored. This is because the colour quality obtained in the image degrades significantly as the surface orientation of the object relative to the image becomes very steep. The part of the master image on which the surface element maps is then improved by a weighted average of all the colour image mapped parts. The basis of the weighting is the cosine of the difference in surface normal between the surface element and the colour image.

The apparatus and methods disclosed above each singly produce an improved colour 'copy' of the 3D model and a significant commercial advantage.

Figure 23:
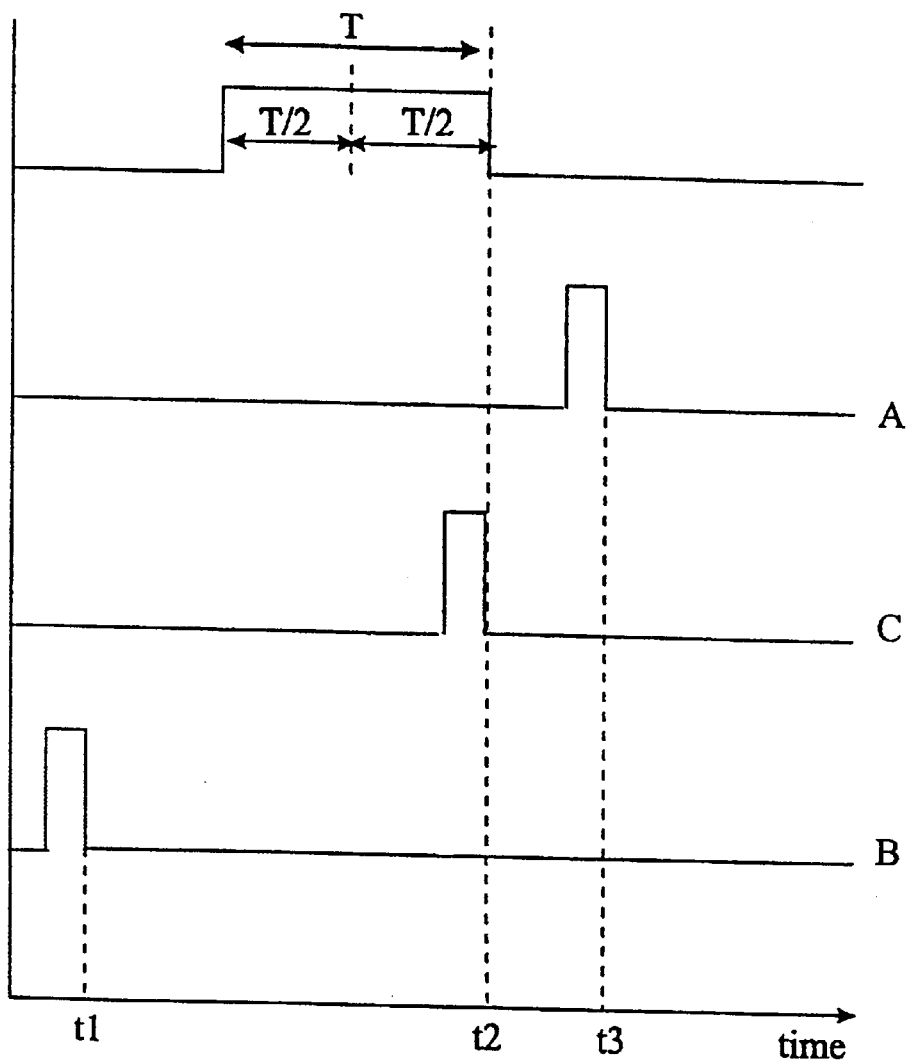
FIG. 23 illustrates the timing for position interpolation.

Ways of improving the scanning timing and consequently reducing geometrical errors are disclosed.

Where no electrical triggering is possible, to reduce the inaccuracy caused by the time difference between the recording of the arm position and the capturing of the fame, the following method is employed:

1. With reference now to FIG. 23, the arm position before the frame is captured B is recorded and the time t1 of this recorded.
2. A frame is requested.
3. When the frame has been captured C the time t2 is recorded. There is a known delay T/2 with little variability from the middle of the frame capture to this time t2 which is largely dependent on the shutter time open T.
4. The arm position after A is recorded and the time t3 of this is recorded.
5. The arm position in the middle of the frame is estimated by interpolating in six degrees of freedom between the two arm positions B,A using the time (t2–T/2) at the middle of the frame capture as the interpolation weighting between t1 and t3.
6. In the case of a long interrupt if the difference between t1 and t3 is significantly large then the data is deleted.

This interpolation method can increase the accuracy of a non-triggered system by a large amount and is extremely significant in the quest to obtain geometrically accurate data.

In addition, the operating system under which the interpolation software runs may be set to prioritise the interpolation software is high priority so that the introduction of delays due to other software being executed is minimised. Even if another software function interrupts this process, the validity of the process is not impaired unless the interrupting process is of extraordinarily long duration. Prioritisation is not essential but will contribute to reduced timing error where prioritising is available in the operating system.

Figure 24:
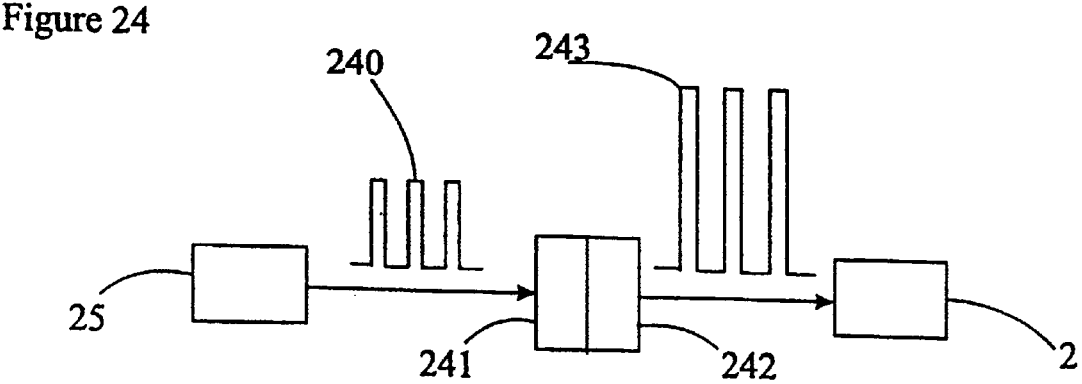
FIG. 24 illustrates the triggering of the arm position measurement.

In the case triggering is possible, there are many methods of carrying it out. One method is with reference now to FIG. 24 that the synchronisation signal 240 from a CCD camera 25 is stripped off by electronic circuitry 241 and a relay 242 is used to generate a series of trigger pulses 243 to the arm computer 2. This has the advantage of eliminating both the arm and camera variabilities and increasing the accuracy of the scanning as much as possible for a given arm and camera.

The operator interface means alone—not including the standard computer means such as mouse and keyboard—can be used to control the scanning and computer model generation process and the functionality of the options that can be actuated. The operator interface means include means for navigating menus such as: buttons, footpedals, joysticks, trackballs and the position sensing means—arm or remove position sensor.

Figure 25:
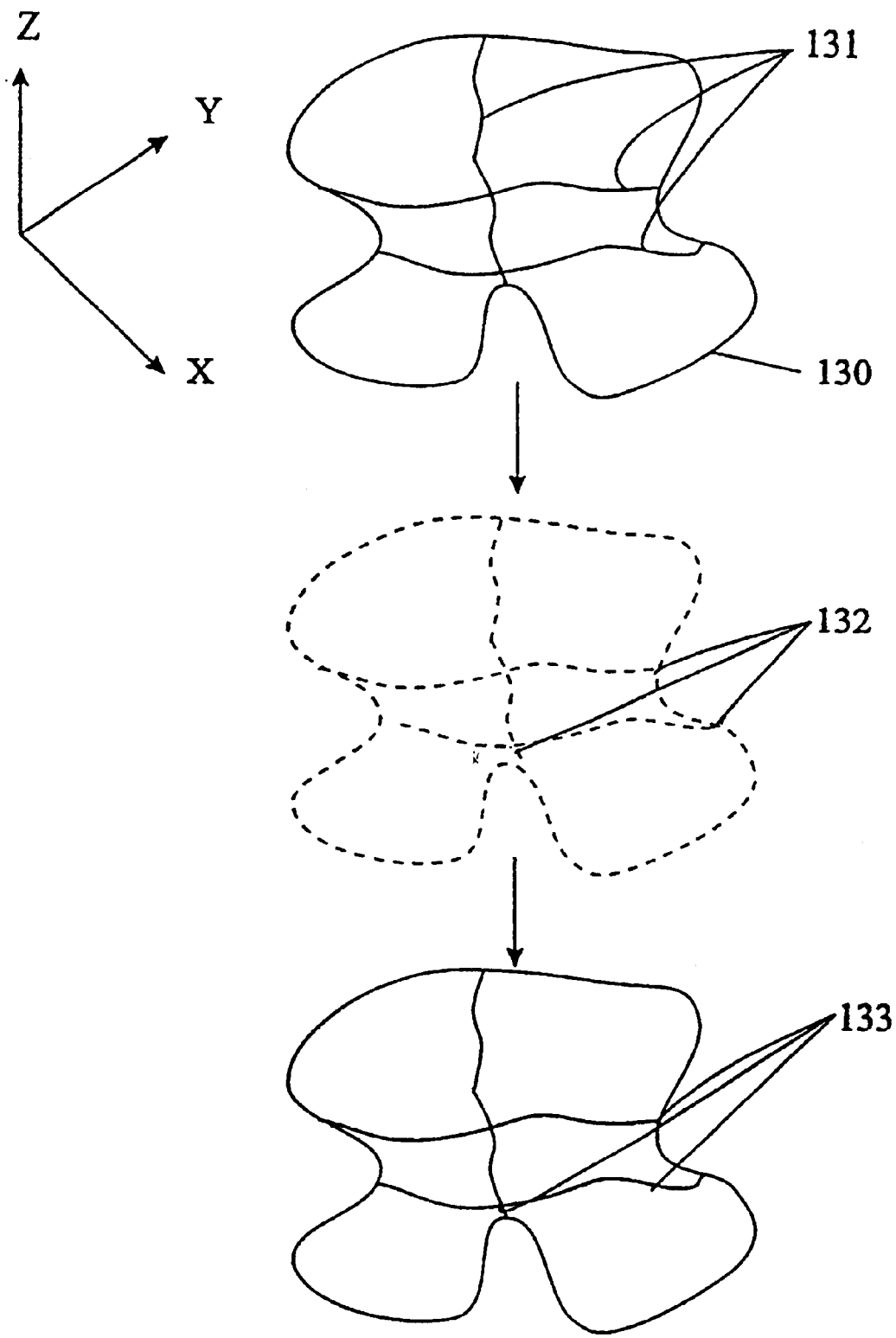
FIG. 25 illustrates an object with marked lines thereon.

Using any of the above means, the operator can simply select the required operations and operating parameters, which could include, for example, being able to:

Setup scanning apparatus
  select which position sensing device is being used ie arm
  align the probe to the position sensing device; align the turntable
  set the sampling of the points i.e. sampling step or chordal tolerance
  set when data thrown away because arm is moving too fast
Data collection
  prescan object to find out where it is
  collect data points continuously whilst that option is selected for example
  collect one set of points such as a stripe section
  collect sets of data points at pre-determined intervals of position
  collect contact reference points
  pause and re-start data collection
  collect colour images
Process
  generate polygonal or surface model from intermediate data
  generate model in selected output format eg 3DS, OBJ
  map colour images onto model
  blend overlapping colour images on model
  close holes in polygon mesh
  slice polygon mesh
  smooth polygon mesh
  decimate polygon mesh
  flip normals in polygon mesh
  change datum and orientation of coordinate system
Edit
  select/cut/past/delete points
  select/cut/past/delete polygons
  select/cut/past/delete colour images
Test
  check the performance of the system by processing data from scanning a sphere
  check the performance of the system by processing data from scanning a flat surface
Display
  display points in rendered colour according to depth
  redraw the computer display from the position and orientation of the probe
  select the field of view of the redraw i.e. from zoom to wide angle
  select the viewpoint from list of present viewpoints
  display rendered data in one colour
  display rendered data using the scanned colour data
  display the computer model generated from polygons or complex surfaces
Model data
  save the points/intermediate data/model onto a storage medium such as a hard disk
  publish the intermediate data/computer model as an object such as an object that may be automatically available to another software package on the computer or over a network
  load the points/intermediate data/model from a storage medium such as a hard disk
Range image
  create a new linear range image using the position and orientation of the probe when the option is selected
  create a new cylindrical range image using the position and orientation of the probe when the option is selected
  select one of the defined range images from all the defined range images
  change the density of that range image
  delete the selected range images
  delete all range images
  select a set of range images from a library of range image sets; library range image sets could be mathematically organised e.g. precisely orthogonal to each other which may have advantages in some uses of the scanned data
  add the selected library set to the currently defined range images
  creating a new library set from the existing combination of range images; in this way if several similar objects are to be scanned, the optimum range image combination can be set for the first one and automatically reused on the others
  setting the selected library set as the default library set; in this way for instance a default library set of six range images that form a cube may be used for many objects such that the process of range image definition is not needed, making the total scanning process quicker
  delete all current data points in all range images
  delete all the data points in the selected range image only
  display points from the selected range image only
  display points from all range images
  display points with different colours for each range image
  update all range images from all the other range images by a process of trying to fill in gaps or check entries in one range image by studying the others
  update the selected range image from all the other range images by an inference process of trying to fill in gaps or check entries in one range image by studying the others; this is particularly useful when a new range image is defined after a lot of scanning has taken place constrain the size of a range image; this often done when a range image is defined specially to capture a small part of the surface of the object that is not covered by the other range images; this can be done to save memory on a computer with limited memory and can also speed up the whole process choose and initiate an algorithm for automatically constructing a model of polygons or complex surfaces from one range image choose and initiate an algorithm for automatically constructing a model of polygons or complex surfaces from all the range images set the parameters such as the degree of accuracy by which an algorithm constructs a model of polygons or complex surfaces select an integration algorithm that combines the polygon model which have been generated from the range images.

select a predefined sequence of algorithms which automatically generates a complete model of polygons or complex surfaces from a set of range images Complex surfaces can be created from marked surface patch boundaries. Referring now to FIG. 25, the object 130 is painted a uniform colour(if necessary) before marking the patch boundaries 131 by hand in another colour e.g. using a black marker pen on a white object. It is not important to mark these boundaries accurately as they usually lie away from features such as edges or rapid changes in surface normal. The object is then scanned in using one of the methods disclosed. The colour information is then used to automatically generate the patch boundaries by means of an algorithm which separates out the points 132 lying on the patch boundaries by means of a colour filter and then fits patch boundary lines such as splines 133 to these points. The edges may also be detected using a separate algorithm. The patch boundaries which have been automatically created from the scan can then be used to create the complex surface model. The main benefit of this method is that it is easier to mark patch boundaries on the object than on the computer model prior to the automatic creation of the complex surface model.

Figure 26A:
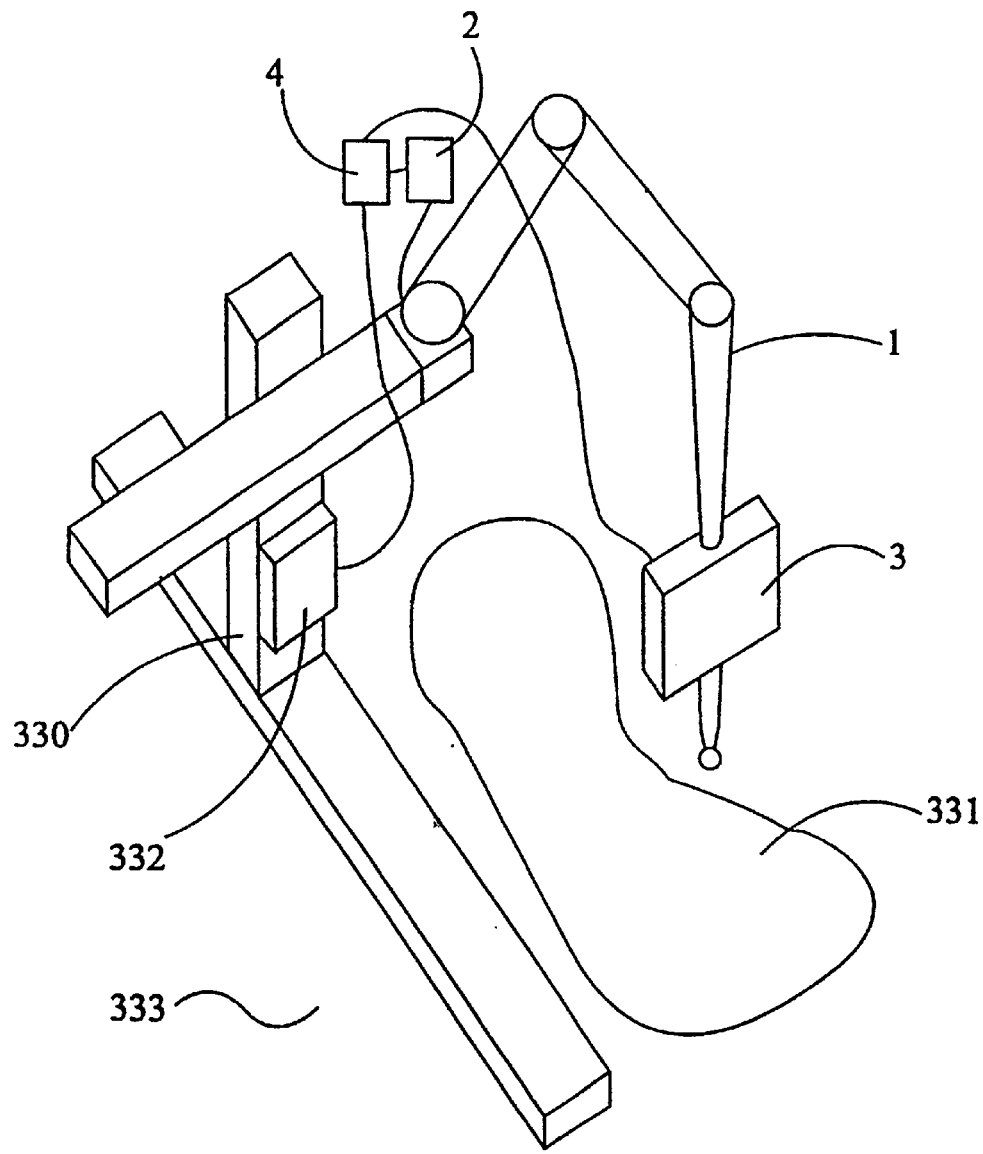
FIG. 26a illustrates a probe mounted on a multiply jointed arm which is mounted on a horizontal arm machine.

Referring now to FIG. 26a, an important implementation 333 of the invention is disclosed in which the multiply jointed arm 1 is mounted on the end of the horizontal arm measuring machine 330 for scanning a large object 331. The horizontal arm measuring machine 330 has a machine control boss 332 which outputs the position of the machine to the computer 4. The arm control 2 and the probe 3 are also connected to the computer 4. This implementation makes the scanning of large objects more precise in that either a large arm or leapfrogging would be less accurate than a horizontal arm and simpler in that each time the horizontal arm is moved the software takes it into account automatically rather than needing to reregister using a leapfrogging method. In industry firms who have large objects such as automotive manufacturers usually have horizontal arm machines so this makes the implementation particularly attractive.

Figure 26B:
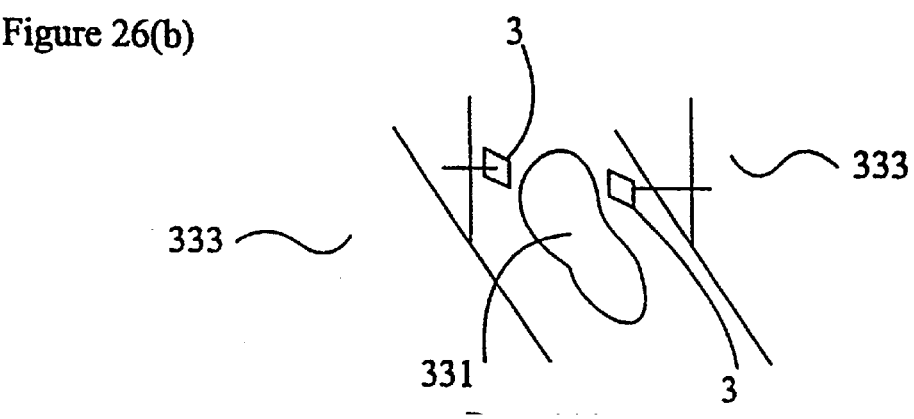
FIG. 26b illustrates two opposing horizontal arm machines.

Referring now to FIG. 26b, firms who have large objects such as automotive manufacturers often have two horizontal arm machines situated opposing each other both of which can reference to the same object coordinate system. In this case the whole of the object may be scanned by scanning part of the object with the probe fitted to the first horizontal arm machine and the rest of the object with the probe fitted to the second horizontal arm machine.

This invention is a general 3D model making device and has wide ranging applicability. The application industries for this invention include: design stylists who need to turn clay objects into computer models quickly and accurately; games developers and animators who need to convert new characters into 3D data sets for animation; show manufacturers who need to make custom shoes; automotive manufacturers who need to model the actual cable and pipe runs in confined spaces; medical applications include radiotherapy and wound treatment. Altogether some 200 applications have been identified for this invention.

Figure 27:
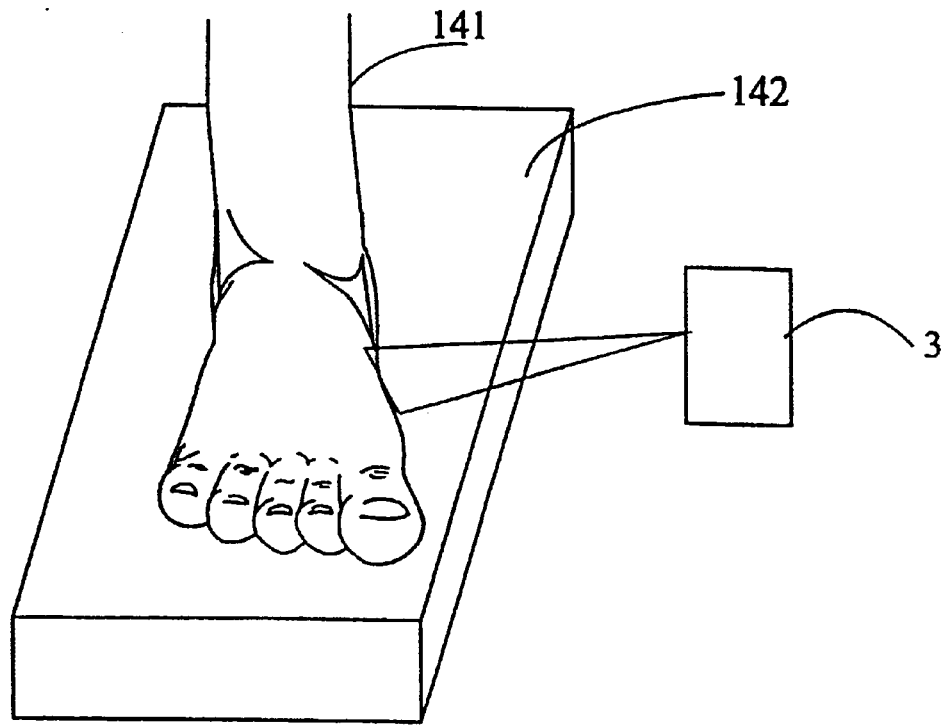
FIG. 27 illustrates a human foot being scanned.
Figure 27:
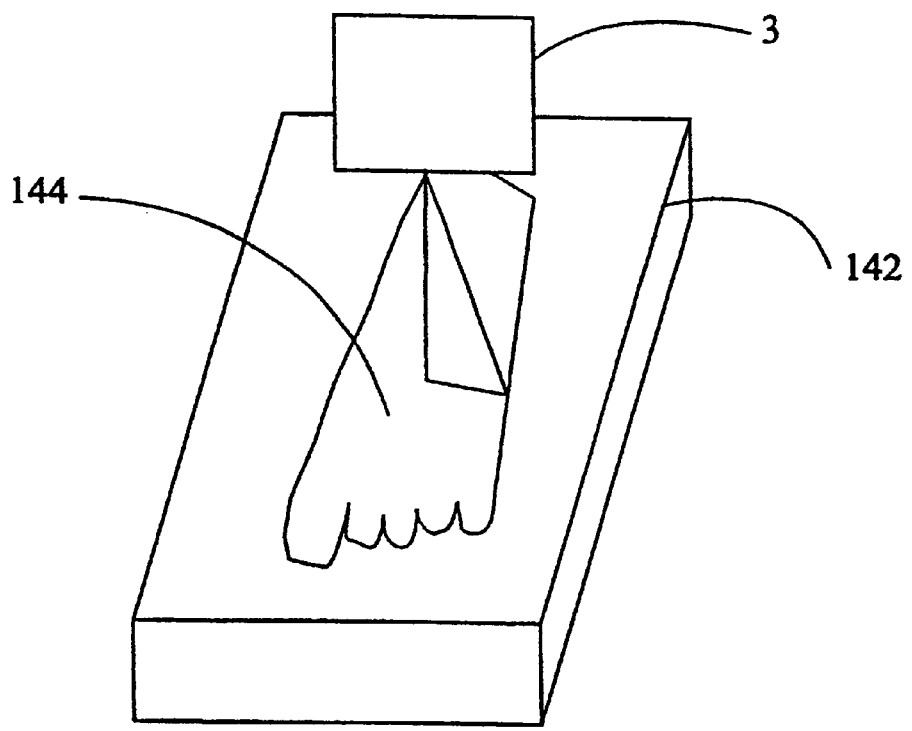

Referring now to FIG. 27, as an example of the applications for the scanning apparatus 100 in accordance with the invention, the scanning apparatus 100 can be used to scan a human foot 141 with full body weight on it on surfaces of different resilience is also disclosed. The outside of the foot 141 is first scanned using the methods and devices disclosed above with the required amount of body weight being exerted. The food 141 is then removed and a second scan is carried out of the surface 142 on which the foot 141 was pressed. The first scan is a positive. The second scan is a negative. The surface normals of the second scan are then reversed by means of a simple algorithm and the two scans combined to give the positive shape of the foot. It is important that if a deformable material is used that it does not spring back. Such a material might be sand, clay or plaster. Materials of different resilience may be appropriate for different applications. This method is also appropriate when the foot is pressed onto the lower half of a shoe with the sides cut away.

There is a need by automobile manufacturers to identify the actual route of pipes and cables in confined areas such as an engine department. Automobile manufacturers are trying to model in 3D CAD all aspects of a car. They need some way of scanning pipes and cables in the car reference system so that high level 3D models of the pipes and cables are output that can be introduced into the CAD system for identifying actual routeing and potential interferences. In the scanning of pipes and cables for instance in confined spaces if there is a problem with black or shiny items not being scannable these can be first dusted with a white powder that is easily removed after scanning.

Figure 28A:
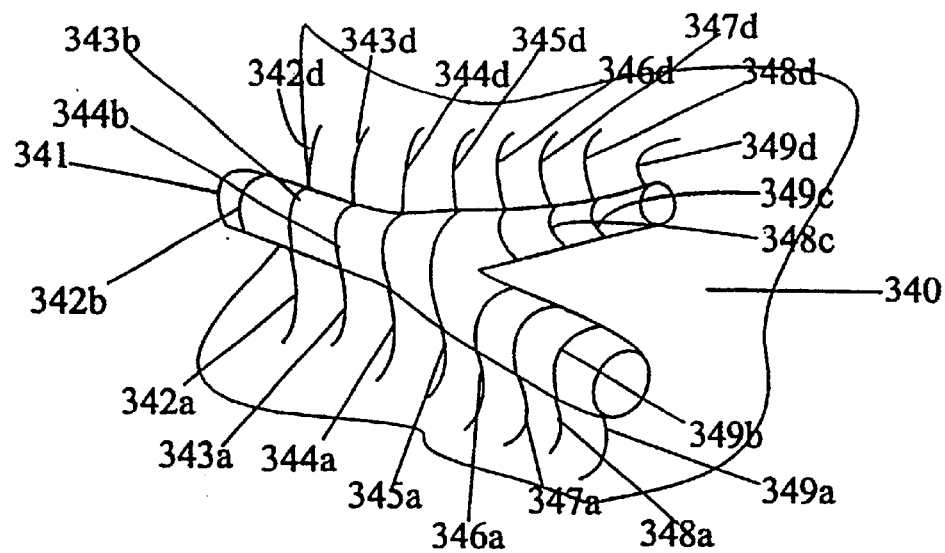
FIG. 28a illustrates stripe sections of a pipe network and panel.
Figure 28B:
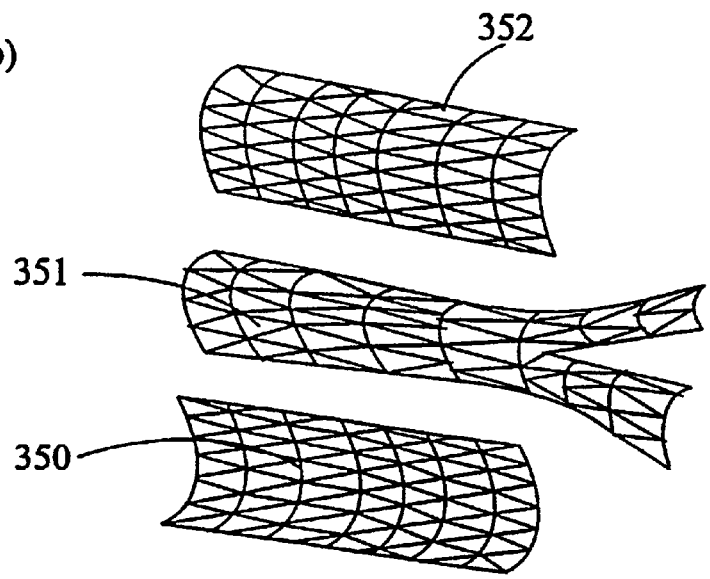
FIG. 28b illustrates partial polygon models of a pipe network and panel.
Figure 28C:
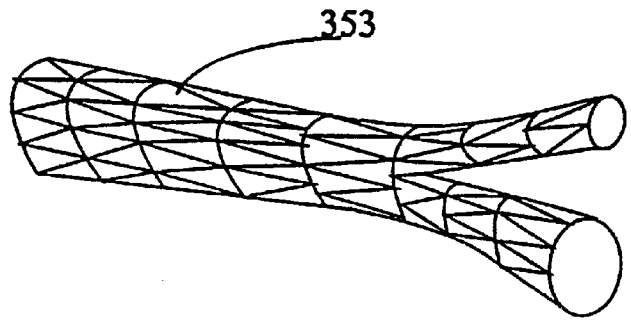
FIG. 28c illustrates extrapolated polygon model of a pipe network.

Referring now to FIG. 28, it is often better to scan a cable or pipe 341 as a number of stripe sections 342 to 349 rather than a large number of densely spaced stripes. A stripe sensor can be activated in a first mode to take a single stripe section by the operator activating a button or footpedal. In this way the operator can take a small number of sections to describe the path of the pipe using his expertise to decide when to take section. For instance where a pipe joins another pipe it may be appropriate to capture many more stripe sections 344 to 349. Also, where there is a feature such as a fixing on a pipe it may be appropriate to capture very dense stripes. A second mode would be capturing stripe sections as fast as the sensor can capture them and displaying them as a surface on the display. A third mode would be a mode in which the operator specifies the distance between the sections e.g. 5 mm and the system automatically takes a stripe section every e.g. 5 mm that the stripe travels in 3D space. One method of determining this distance is to select the point at the average stand-off distance in the middle of the stripe i.e. the centre point of the measuring range and when this point has moved 5 mm to automatically capture another stripe section. When the operator is scanning pipes and cables, the operator control system should support the simple switching between the three modes.

The intermediate data structure in which the stripe sections are collated could be the standard stripe section structure 303 but including the changes in mode and the orientation of the probe for each section.

In scanning pipes and cables, panel sections along which the pipes and cables run are also captured 342*a*, 342*d*. Where there is no contact between the pipe and the panel, there is a jump or break in the stripe section. These can be flagged in the data structure with jump flags 305 and break flags 304.

To be useful to an automobile manufacturer, a high level model should be created and output from this data. A polygonisation or surfacing method joins the sections together and can handle the joining of pipes, panels etc. The result is high level models 350 to 352. If more information is known about the pipe or cable such as its section if it is constant or its form even if the form's dimensions change e.g. circular but varying diameter, the model 351 can be automatically expanded to 353. Alternatively two scanned sides of the same pipe can be automatically joined. This gives the automobile manufacturer the high level model that he needs.

As will be understood to persons skilled in the art, there are various modifications within the scope of the present invention. For example: The colour camera does not need to be included. A single camera could be utilised for both colour and position sensing. The filter in the probe could be a narrow band pass filter or a red high band pass filter as required. The system is adaptable to many types of model generation not just those discussed herein. The data collected by the probe could be used for other applications, and could be stored for dissemination elsewhere, for example, by electronic mail. The probe can be a stripe or an area probe. The display can be mounted anywhere depending upon the application requirements.

What is claimed is:

1. Scanning apparatus for scanning an object to generate three-dimensional data, comprising:
    a scanner mounted on a multiply-jointed arm for movement by an operator to scan the object to capture data from a plurality of points on the surface of the object, the scanner comprising:
        a light source operable to emit light onto the object surface; and
        a light detector operable to detect light reflected from the object surface by recording reflected light at recording times defined by a synchronization signal;
    a position calculator for calculating the position of the multiply-jointed arm, and outputting position data defining the position in response to a trigger pulse;
    a trigger pulse generator for receiving the synchronization signal for the light detector defining the recording times thereof, and, in response thereto, generating and outputting trigger pulses to the position calculator to cause the position calculator to output position data for each of at least some of the recordings by the light detector; and
    a three dimensional data generator for receiving recorded data output by the light detector and associated position data output from the position calculator, and for processing the data to generate three-dimensional data relating to the object.

2. Apparatus for use in scanning an object, comprising:
    a scanner for mounting on a multiply-jointed arm for movement by an operator to scan an object to capture data from a plurality of points on the surface of the object, comprising:
        a light source operable to emit light onto the object surface; and
        a light detector operable to detect light reflected from the object surface by recording reflected lights at recording times defined by a synchronization signal;
    a trigger pulse generator for receiving the synchronization signal for the light reflector defining the recording time thereof, and, in response thereto, generating and outputting trigger pulses for the position calculator of a multiply-jointed arm to cause the position calculator to output position data for each of at least some of the recordings by the light detector; and
    a three-dimensional data generator for receiving recorded data output by the light detector and associated position data output from the position calculator, and for processing the data to generate three-dimensional data relating to the object.

3. Scanning apparatus for scanning an object to generate three-dimensional data, comprising:
    a scanner mounted on a multiply-jointed arm for movement by an operator to scan the object to capture data from points on the surface of the object, the scanner comprising:
        a light source operable to emit light onto the object surface;
        a light detector operable to detect light reflected from the object surface; and
    a tip probe for touching the object surface at individual points;
    a position calculator for calculating the position of the multiply-jointed arm, and outputting position data defining the position;
    a controller for switching between a first data capture mode of the apparatus in which the apparatus is operable to capture data from a plurality of points on the surface of the object by irradiating the object with light from the light source and detecting light reflected from the object surface with the light detector while the tip probe remains present on the multiple-jointed arm, and a second data capture mode in which the apparatus is operable to capture data from individual points on the surface of the object touched by the tip probe while the light source and light detector remain present on the multiple-jointed arm; and
    a three-dimensional data generator for receiving recorded data output by the light detector and position data output from the position calculator, and for processing the data to generate three-dimensional data relating to the object.

4. Apparatus for use in scanning an object, comprising:
    a scanner for mounting on a multiply-jointed arm for movement by an operator to scan an object to capture data from points on the surface of the object, comprising:
        a light source operable to emit light onto the object surface;
        a light detector operable to detect light reflected from the object surface; and
        a tip probe for touching the object surface at individual points;
    a controller for switching between a first data capture mode of the apparatus in which the apparatus is operable to capture data from a plurality of points on the surface of the object by irradiating the object with light from the light source and detecting light reflected from the object surface with the light detector while the tip probe remains present on the multiple-jointed arm, and a second data capture mode in which the apparatus is operable to capture data from individual points on the surface of the object touched by the tip probe while the light source and light detector remain present on the multiple-jointed arm; and a three-dimensional data generator for receiving recorded data output by the light detector and associated position data output from the position calculator of the multiply-jointed arm, and for processing the data to generate three-dimensional data relating to the object.

5. Scanning apparatus according to claim 3 or claim 4, wherein the light source and the light detector are arranged within a common housing and wherein the common common housing is mountable on and de-mountable from the multiply-jointed arm without removing the tip probe.

6. A method of synchronizing the recording of reflected light by a light detector and the generation of data defining the position of the light detector in a system for scanning an object to generate three-dimensional data, having a scanner mounted on a multiply-jointed arm for movement by an operator to scan the object to capture data from a plurality of points on the surface of the object, the scanner comprising:
  a light source operable to emit light onto the object surface; and
  a light detector operable to detect light reflected from the object surface by recording reflected light at recording times defined by a synchronization signal;

a position calculator for calculating the position of the multiply-jointed arm, and outputting position data defining the position in response to a trigger pulse; and a three-dimensional data generator for receiving recorded data output by the light detector and associated position data output from the position calculator, and for processing the data to generate three-dimensional data relating to the object;

the method comprising:
  receiving the synchronization signal for the light detector defining the recording times thereof, and, in response thereto, generating and outputting trigger pulses to the position calculator to cause the position calculator to output position data for each of at least some of the recordings by the light detector.

7. Scanning apparatus for scanning an object to generate a three-dimensional data, comprising:

scanning means mounted on a multiply-jointed arm for movement by an operator to scan the object to capture data from a plurality of points on the surface of the object, the scanning means comprising:
  a light source operable to emit laser light onto the object surface; and
  a light detecting means for detecting light reflected from the object surface by recording reflected light at recording times defined by a synchronization signal;

position calculating means for calculating the position of the multiply-jointed arm, and outputting position data defining the position in response to a trigger pulse;

trigger pulse generating means for receiving the synchronization signal for the light detecting means defining the recording times thereof, and, in response thereto, generating and outputting trigger pulses to the position calculating means to cause the position calculating means to output position data for each of at least some of the recordings by the light detecting means; and three-dimensional data generating means for receiving recorded data output by the light detecting means and associated position data output from the position calculating means, and for processing the data to generate three-dimensional data relating to the object.

8. Apparatus for use in scanning an object, comprising:

scanning means for mounting on a multiply-jointed arm for movement by an operator to scan an object to capture data from a plurality of points on the surface of the object, comprising:
  a light source operable to emit light onto the object surface; and
  light detecting means for detecting light reflected from the object surface by recording reflected light at recording times defined by a synchronization signal;

trigger pulse generating means for receiving the synchronization signal for the light detecting means defining the recording times thereof, and, in response thereto, generating and outputting trigger pulses for the position calculating means of a multiply-jointed arm to cause the position calculating means to output position data for each of at least some of the recordings by the light detecting means; and three-dimensional data generating means for receiving recorded data output by the light detecting means and associated position data output from the position calculating means, and for processing the data to generate three-dimensional data relating to the object.

9. Scanning apparatus for scanning an object to generate three-dimensional data, comprising:

scanning means mounted on a multiply-jointed arm for movement by an operator to scan the object to capture data from points on the surface of the object, the scanning means comprising:
  a light source operable to emit light onto the object surface;
  light detecting means for detecting light reflected from the object surface; and
  a tip probe for touching the object surface at individual points;

position calculating means for calculating the position of the multiply-jointed arm, and outputting position data defining the position;

control means for switching between a first data capture mode of the apparatus in which the apparatus is operable to capture data from a plurality of points on the surface of the object by irradiating the object with light from the light source and detecting light reflected from the object surface with the light detecting means while the tip probe remains present on the multiply-jointed arm, and a second data capture mode in which the apparatus is operable to capture data from individual points on the surface of the object touched by the tip probe while the light source and light detecting means remain present on the multiply-jointed arm; and three-dimensional data generating means for receiving recorded data output by the light detecting means and position data output from the position calculating means, and for processing the data to generate three-dimensional data relating to the object.

10. Apparatus for use in scanning an object, comprising:

scanning means for mounting on a multiply-jointed arm for movement by an operator to scan an object to capture data from points on the surface of the object, comprising:
  a light source operable to emit light onto the object surface;
  a light detecting means for detecting light reflected from the object surface; and a tip probe for touching the object surface at individual points;

control means for switching between a first data capture mode of the apparatus in which the apparatus is operable to capture data from a plurality of points on the surface of the object by irradiating the object with light from the light source and detecting light reflected from the object surface with the light detecting means while the tip probe remains present on the multiply-jointed arm, and a second data capture mode in which the apparatus is operable to capture data from individual points on the surface of the object touched by the tip probe while the light source and light detecting means remain present on the multiply-jointed arm; and three-dimensional data generating means for receiving recorded data output by the light detecting means and associated position data output from the position calculating means of the multiply-jointed arm, and for processing the data to generate three-dimensional data relating to the object.

11. A method of synchronizing the recording of reflected light by light detecting means and the generation of data defining the position of the light detecting means in a system for scanning an object to generate three-dimensional data, having:

scanning means mounted on a multiply-jointed arm for movement by an operator to scan the object to capture data from a plurality of points on the surface of the object, the scanning means comprising:

a light source operable to emit light onto the object surface; and light detecting means for detecting light reflected from the object surface by recording reflected light at recording times defined by a synchronization signal;

position calculating means for calculating the position of the multiply-jointed arm, and outputting position data defining the position in response to a trigger pulse; and three-dimensional data generating means for receiving recorded data output by the light detecting means and associated position data output from the position calculating means, and for processing the data to generate three-dimensional data relating to the object;

the method comprising:

receiving the synchronization signal for the light detecting means defining the recording times thereof, and, in response thereto, generating and outputting trigger pulses to the position calculating means to cause the position calculating means to output position data for each of at least some of the recordings by the light detecting means.

* * * * *

UNITED STATES PATENT AND TRADEMARK OFFICE
CERTIFICATE OF CORRECTION

PATENT NO. : 6,611,617 B1
DATED : August 26, 2003
INVENTOR(S) : S.J. Crampton

It is certified that error appears in the above-identified patent and that said Letters Patent is hereby corrected as shown below:

<u>Title page,</u>
Item [56], References Cited, U.S. PATENT DOCUMENTS, "5,264,578" should read -- 5,264,678 --
Item [57], ABSTRACT,
Line 8, "model; display" should read -- model display --
Line 13, "turnable" should read -- turntable --

<u>Column 30,</u>
Line 5, "light reflector" should read -- light detector --
Line 5, "recording time" should read -- recording times --
Lines 26-27, the subclaim beginning "a tip probe…" should be double-indented, to match the subclaim above it --
Lines 38, 43 and 66, "multiple-jointed" should read -- multiply-jointed --

<u>Column 31,</u>
Line 4, "multiple-jointed" should read -- multiply-jointed --
Line 12, "common common" should read -- common --
Line 45, before "three-dimensional" delete "a"
Line 50, before "light onto" delete "laser"

Signed and Sealed this

Twentieth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,611,617 B1  Page 1 of 1
DATED : August 26, 2003
INVENTOR(S) : S.J. Crampton It is certified that error appears in the above-identified patent and that said Letters Patent is hereby corrected as shown below:

<u>Title page,</u>
Item [56], References Cited, FOREIGN PATENT DOCUMENTS,
"DE PCT/AT91/00115  5/1992" should read -- WO PCT/AT91/00115  5/1992 --;
"FR PCT/FR90/00090  9/1990" should read -- WO PCT/FR90/00090  9/1990 --; and
"GB PCT/GB95/01994  2/1996" should read -- WO PCT/GB95/01994 2/1996 --.

Signed and Sealed this

Twenty-third Day of March, 2004

JON W. DUDAS
*Acting Director of the United States Patent and Trademark Office*